United States Patent
Yang et al.

(10) Patent No.: US 12,425,921 B2
(45) Date of Patent: Sep. 23, 2025

(54) PHYSICAL LAYER LATENCY REDUCTION

(71) Applicant: QUALCOMM Incorporated, San Diego, CA (US)

(72) Inventors: Lin Yang, San Diego, CA (US); Bin Tian, San Diego, CA (US); Youhan Kim, Saratoga, CA (US); Sameer Vermani, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 370 days.

(21) Appl. No.: 18/296,772

(22) Filed: Apr. 6, 2023

(65) Prior Publication Data
US 2024/0340701 A1    Oct. 10, 2024

(51) Int. Cl.
*H04W 28/08*    (2023.01)
*H04L 5/00*    (2006.01)
*H04W 72/543*    (2023.01)
*H04W 84/12*    (2009.01)

(52) U.S. Cl.
CPC ....... *H04W 28/0975* (2020.05); *H04L 5/0044* (2013.01); *H04L 5/0064* (2013.01); *H04W 72/543* (2023.01); *H04W 84/12* (2013.01)

(58) Field of Classification Search
CPC ........... H04W 28/0975; H04W 72/543; H04W 84/12; H04W 28/02; H04L 5/0044; H04L 5/0064; H04L 5/0007; H04L 27/2602; H04L 27/2603
See application file for complete search history.

(56) References Cited

U.S. PATENT DOCUMENTS

| 2022/0361190 | A1  | 11/2022 | Lee et al. |
| 2022/0416964 | A1  | 12/2022 | Fang et al. |
| 2023/0026249 | A1* | 1/2023  | Chu ................. H04W 28/0268 |

OTHER PUBLICATIONS

International Search Report and Written Opinion—PCT/US2024/015314—ISA/EPO—May 28, 2024 (2301168WO).

(Continued)

*Primary Examiner* — Eric Myers
(74) *Attorney, Agent, or Firm* — Arun Swain

(57) ABSTRACT

This disclosure provides methods, components, devices and systems for physical layer (PHY) latency reduction. Some aspects more specifically relate to PHY protocol data unit (PPDU) designs that support inserting low-latency traffic into a transmission opportunity (TXOP) occupied by non-low-latency traffic. In some implementations, during a TXOP, an access point (AP) may output an aggregated PPDU (A-PPDU) that is aggregated in a time domain and includes an A-PPDU header and one or more A-PPDU subframes. The AP may obtain, from an application layer, a low-latency PPDU (LL-PPDU) subframe and may insert the LL-PPDU subframe in place of at least one of the one or more A-PPDU subframes. The AP may output the LL-PPDU subframe during the TXOP. A wireless station (STA) receiving the A-PPDU header and the one or more A-PPDU subframes may detect the presence of the LL-PPDU subframe and may receive and decode the LL-PPDU subframe.

30 Claims, 10 Drawing Sheets

(56) References Cited

OTHER PUBLICATIONS

Park E., et al., "Considerations on PHY Designs for mmWave Band", IEEE Draft, 11-22-1872-00-0UHR-Considerations-ON-PHY-DESIGNS-FOR-Mmwave-Band, IEEE-SA Mentor, Piscataway, NJ, USA, vol. 802.11 UHR, Nov. 13, 2022, pp. 1-16, XP068198980, Slide 12.

Yang B B., et al., "Further Improve Latency Performance in 11be", 11-21-0670-00-00BE-Further-Improve-Latency-Performance-IN11BE, IEEE-SA Mentor, Piscataway, NJ, USA, vol. 802.11 EHT, 802.11be, Apr. 20, 2021, Apr. 13, 2021, pp. 1-13, XP068179836, Slides 7-10.

* cited by examiner

PHYSICAL LAYER LATENCY REDUCTION

TECHNICAL FIELD

This disclosure relates to wireless communication and, more specifically, to physical layer latency reduction.

DESCRIPTION OF THE RELATED TECHNOLOGY

A wireless local area network (WLAN) may be formed by one or more wireless access points (APs) that provide a shared wireless communication medium for use by multiple client devices also referred to as wireless stations (STAs). The basic building block of a WLAN conforming to the Institute of Electrical and Electronics Engineers (IEEE) 802.11 family of standards is a Basic Service Set (BSS), which is managed by an AP. Each BSS is identified by a Basic Service Set Identifier (BSSID) that is advertised by the AP. An AP periodically broadcasts beacon frames to enable any STAs within wireless range of the AP to establish or maintain a communication link with the WLAN.

SUMMARY

The systems, methods, and devices of this disclosure each have several innovative aspects, no single one of which is solely responsible for the desirable attributes disclosed herein.

A method for wireless communications at an access point (AP) may include identifying a transmission opportunity associated with communication via at least one subchannel of a wireless channel, outputting, via the at least one subchannel during the transmission opportunity, a first portion of a packet that includes an aggregated physical layer control protocol (PLCP) protocol data unit (PPDU) (A-PPDU) header and a first subset of A-PPDU subframes of a set of A-PPDU subframes, the set of A-PPDU subframes aggregated in a time domain of the wireless channel, obtaining, from an application layer, a low-latency PPDU (LL-PPDU) subframe associated with latency-sensitive traffic, inserting the LL-PPDU subframe in place of at least one A-PPDU subframe of a second subset of A-PPDU subframes of the set of A-PPDU subframes in accordance with the latency-sensitive traffic, and outputting, via the at least one subchannel during the transmission opportunity, a second portion of the packet that includes the LL-PPDU subframe and the second subset of A-PPDU subframes in accordance with the A-PPDU header.

In some embodiments, an AP may include at least one memory, and at least one processor communicatively coupled with the at least one memory, the at least one processor operable to cause the AP to identify a transmission opportunity associated with communication via at least one subchannel of a wireless channel, outputting, via the at least one subchannel during the transmission opportunity, a first portion of a packet that includes an A-PPDU header and a first subset of A-PPDU subframes of a set of A-PPDU subframes, the set of A-PPDU subframes aggregated in a time domain of the wireless channel, obtain, from an application layer, an LL-PPDU subframe associated with latency-sensitive traffic, insert the LL-PPDU subframe in place of at least one A-PPDU subframe of a second subset of A-PPDU subframes of the set of A-PPDU subframes in accordance with the latency-sensitive traffic, and outputting, via the at least one subchannel during the transmission opportunity, a second portion of the packet that includes the LL-PPDU subframe and the second subset of A-PPDU subframes in accordance with the A-PPDU header.

In some embodiments, an apparatus for wireless communications at an AP may include means for identifying a transmission opportunity associated with communication via at least one subchannel of a wireless channel, means for outputting, via the at least one subchannel during the transmission opportunity, a first portion of a packet that includes an A-PPDU header and a first subset of A-PPDU subframes of a set of A-PPDU subframes, the set of A-PPDU subframes aggregated in a time domain of the wireless channel, means for obtaining, from an application layer, an LL-PPDU subframe associated with latency-sensitive traffic, means for inserting the LL-PPDU subframe in place of at least one A-PPDU subframe of a second subset of A-PPDU subframes of the set of A-PPDU subframes in accordance with the latency-sensitive traffic, and means for outputting, via the at least one subchannel during the transmission opportunity, a second portion of the packet that includes the LL-PPDU subframe and the second subset of A-PPDU subframes in accordance with the A-PPDU header.

In some embodiments, a non-transitory computer-readable medium may store code for wireless communications at an AP, and the code may include instructions executable by a processor to identify a transmission opportunity associated with communication via at least one subchannel of a wireless channel, outputting, via the at least one subchannel during the transmission opportunity, a first portion of a packet that include an A-PPDU header and a first subset of A-PPDU subframes of a set of A-PPDU subframes, the set of A-PPDU subframes aggregated in a time domain of the wireless channel, obtain, from an application layer, an LL-PPDU subframe associated with latency-sensitive traffic, insert the LL-PPDU subframe in place of at least one A-PPDU subframe of a second subset of A-PPDU subframes of the set of A-PPDU subframes in accordance with the latency-sensitive traffic, and outputting, via the at least one subchannel during the transmission opportunity, a second portion of the packet that include the LL-PPDU subframe and the second subset of A-PPDU subframes in accordance with the A-PPDU header.

In some examples, the A-PPDU header includes a physical layer (PHY) preamble and an indication of at least one of a PPDU type, a periodic time interval for inserting LL-PPDU subframes, and a length of the packet. In some implementations, a first A-PPDU subframe of the first subset of A-PPDU subframes includes at least one ultra-high-reliability long training field (UHR-LTF), an ultra-high-reliability signal field (UHR-SIG), and a data payload and the LL-PPDU subframe and each A-PPDU subframe subsequent to the first A-PPDU subframe in the set of A-PPDU subframes includes an ultra-high-reliability short training field (UHR-STF) associated with a respective receiving station (STA), a UHR-LTF, and a UHR-SIG.

In some examples, the LL-PPDU subframe and each A-PPDU subframe subsequent to the first A-PPDU subframe in the set of A-PPDU subframes includes a midamble, the midamble including at least one orthogonal frequency division multiplexing (OFDM) symbol that includes synchronization information for the respective receiving STA.

In some examples, the A-PPDU header may be output via the set of subchannels of the wireless channel and the A-PPDU header allocates orthogonal frequency division multiple access (OFDMA) resource units (RUS) for the set of A-PPDU subframes.

A method for wireless communication at a STA may include identifying a transmission opportunity associated with communication via at least one subchannel of a wireless channel, receiving, via the at least one subchannel during the transmission opportunity, a first portion of a packet that includes an A-PPDU header and a first subset of A-PPDU subframes of a set of A-PPDU subframes, the set of A-PPDU subframes aggregated in a time domain of the wireless channel, detecting that an LL-PPDU subframe associated with latency-sensitive traffic is inserted in place of at least one A-PPDU subframe of a second subset of A-PPDU subframes of the set of A-PPDU subframes, receiving, via the at least one subchannel during the transmission opportunity, a second portion of the packet that includes the LL-PPDU subframe and the second subset of A-PPDU subframes of the set of A-PPDU subframes in accordance with the A-PPDU header, and decoding the LL-PPDU subframe in accordance with the detecting and the receiving.

In some embodiments, a STA may include at least one memory, and at least one processor communicatively coupled with the at least one memory, the at least one processor operable to cause the STA to identify a transmission opportunity associated with communication via at least one subchannel of a wireless channel, receive, via the at least one subchannel during the transmission opportunity, a first portion of a packet that includes an A-PPDU header and a first subset of A-PPDU subframes of a set of A-PPDU subframes, the set of A-PPDU subframes aggregated in a time domain of the wireless channel, detect that an LL-PPDU subframe associated with latency-sensitive traffic is inserted in place of at least one A-PPDU subframe of a second subset of A-PPDU subframes of the set of A-PPDU subframes, receive, via the at least one subchannel during the transmission opportunity, a second portion of the packet that includes the LL-PPDU subframe and the second subset of A-PPDU subframes of the set of A-PPDU subframes in accordance with the A-PPDU header, and decode the LL-PPDU subframe in accordance with the detecting and the receiving.

In some embodiments, an apparatus for wireless communications at a STA may include means for identifying a transmission opportunity associated with communication via at least one subchannel of a wireless channel, means for receiving, via the at least one subchannel during the transmission opportunity, a first portion of a packet that includes an A-PPDU header and a first subset of A-PPDU subframes of a set of A-PPDU subframes, the set of A-PPDU subframes aggregated in a time domain of the wireless channel, means for detecting that an LL-PPDU subframe associated with latency-sensitive traffic is inserted in place of at least one A-PPDU subframe of a second subset of A-PPDU subframes of the set of A-PPDU subframes, means for receiving, via the at least one subchannel during the transmission opportunity, a second portion of the packet that includes the LL-PPDU subframe and the second subset of A-PPDU subframes of the set of A-PPDU subframes in accordance with the A-PPDU header, and means for decoding the LL-PPDU subframe in accordance with the detecting and the receiving.

In some embodiments, a non-transitory computer-readable medium may store code for wireless communications at a STA, and the code may include instructions executable by a processor to identify a transmission opportunity associated with communication via at least one subchannel of a wireless channel, receive, via the at least one subchannel during the transmission opportunity, a first portion of a packet that includes an A-PPDU header and a first subset of A-PPDU subframes of a set of A-PPDU subframes, the set of A-PPDU subframes aggregated in a time domain of the wireless channel, detect that an LL-PPDU subframe associated with latency-sensitive traffic is inserted in place of at least one A-PPDU subframe of a second subset of A-PPDU subframes of the set of A-PPDU subframes, receive, via the at least one subchannel during the transmission opportunity, a second portion of the packet that includes the LL-PPDU subframe and the second subset of A-PPDU subframes of the set of A-PPDU subframes in accordance with the A-PPDU header, and decode the LL-PPDU subframe in accordance with the detecting and the receiving.

In some examples, the methods and wireless communication devices may further include operations, features, means, or instructions for enabling packet detection at each time interval boundary in accordance with the indication of the periodic time interval, the LL-PPDU subframe detected in accordance with the packet detection.

In some examples of the methods and wireless communication devices, detecting that the LL-PPDU subframe may be inserted in place of the at least one A-PPDU subframe includes detecting a break indication symbol appended to a final A-PPDU subframe of the first subset of A-PPDU subframes, the break indication symbol indicating that the LL-PPDU subframe may be inserted in place of the at least one A-PPDU subframe and terminating decoding of the final A-PPDU subframe of the first subset of A-PPDU subframes to receive the LL-PPDU subframe.

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

BRIEF DESCRIPTION OF THE DRAWINGS

Like reference numbers and designations in the various drawings indicate like elements.

DETAILED DESCRIPTION

Figure 1:
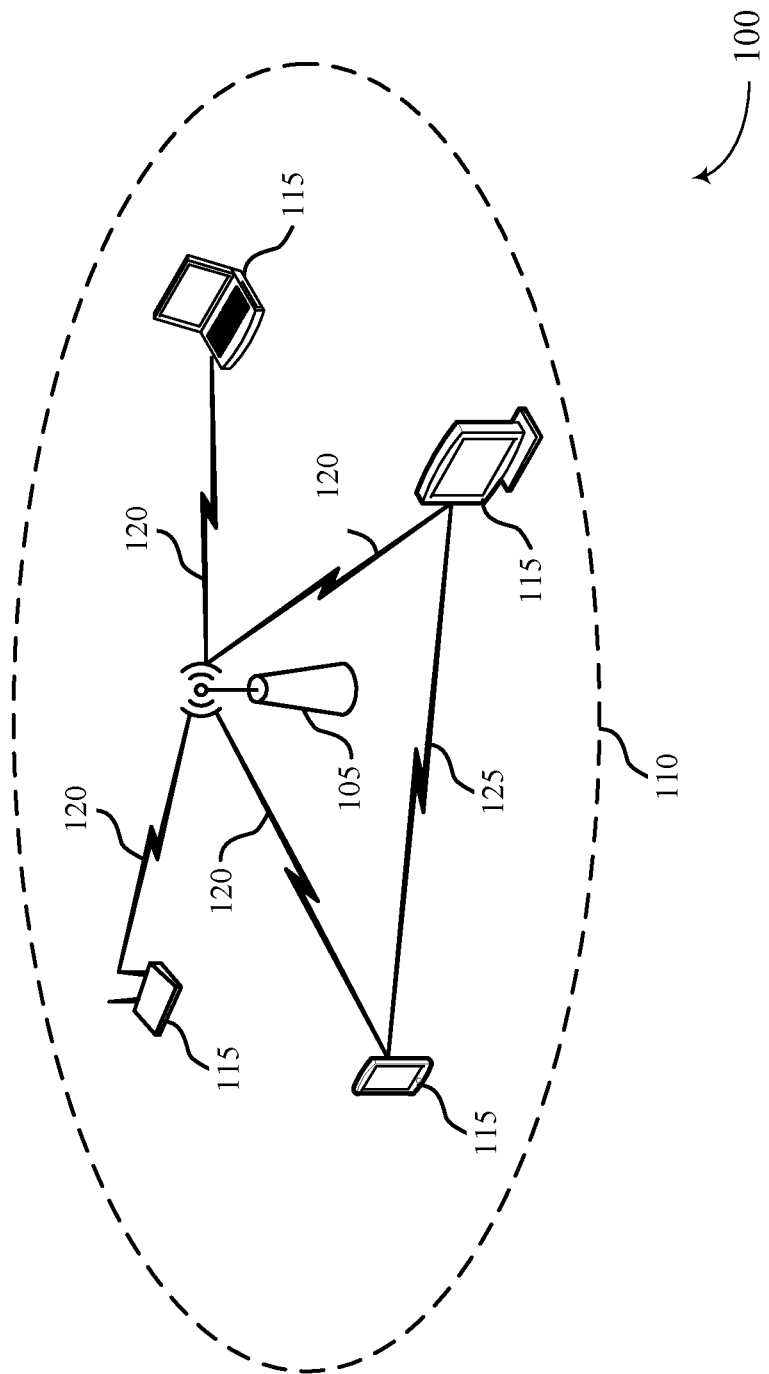
FIG. 1 shows a pictorial diagram of an example wireless communication network.

The following description is directed to some particular examples for the purposes of describing innovative aspects of this disclosure. However, a person having ordinary skill in the art will readily recognize that the teachings herein can be applied in a multitude of different ways. Some or all of the described examples may be implemented in any device, system or network that is capable of transmitting and receiving radio frequency (RF) signals according to one or more of the Institute of Electrical and Electronics Engineers (IEEE) 802.11 standards, the IEEE 802.15 standards, the Bluetooth® standards as defined by the Bluetooth Special Interest Group (SIG), or the Long Term Evolution (LTE), 3G, 4G or 5G (New Radio (NR)) standards promulgated by the 3rd Generation Partnership Project (3GPP), among others. The described examples can be implemented in any device, system or network that is capable of transmitting and receiving RF signals according to one or more of the following technologies or techniques: code division multiple access (CDMA), time division multiple access (TDMA), frequency division multiple access (FDMA), orthogonal FDMA (OFDMA), single-carrier FDMA (SC-FDMA), spatial division multiple access (SDMA), rate-splitting multiple access (RSMA), multi-user shared access (MUSA), single-user (SU) multiple-input multiple-output (MIMO) and multi-user (MU)-MIMO. The described examples also can be implemented using other wireless communication protocols or RF signals suitable for use in one or more of a wireless personal area network (WPAN), a wireless local area network (WLAN), a wireless wide area network (WWAN), a wireless metropolitan area network (WMAN), or an internet of things (IoT) network.

Many wireless devices support applications that rely on low-latency traffic requirements, which may be referred to as low-latency applications or latency-sensitive applications. For example, gaming applications, augmented reality (AR) applications, virtual reality (VR) applications, interactive video applications, and the like, may depend on relatively low latency to provide adequate performance, and may experience performance degradation if associated traffic is delayed. In some cases, to reduce delays, low-latency traffic (also referred to herein as latency-sensitive traffic) may have a higher priority than non-low-latency traffic (also referred to herein as non-latency-sensitive traffic). However, in scenarios where a wireless device obtains low-latency traffic from an application layer of the wireless device during a transmission opportunity (TXOP) occupied by non-low-latency traffic, the low-latency traffic may be delayed until transmission of non-low-latency traffic is complete. Such scenarios may prevent the wireless device from satisfying latency requirements of the low-latency traffic.

Some wireless networks may implement latency reduction schemes to improve latency performance. For example, TXOP sharing schemes may enable low-latency traffic to be included in a same TXOP as non-low-latency traffic. Non-low-latency packets, such as physical layer (PHY) protocol data units (PPDUs), may be grouped into an aggregated PPDU (A-PPDU) to be output by a wireless device during the TXOP. In a TXOP sharing scheme, some PPDUs of the A-PPDU may be pre-emptible. Thus, when the wireless device obtains low-latency traffic, such as a low-latency PPDU (LL-PPDU), during the TXOP, the wireless device may interrupt transmission of a pre-emptible PPDU in favor of the LL-PPDU. For example, the wireless device may stop transmission of a pre-emptible PPDU and may begin outputting the LL-PPDU, which may enable the wireless device to satisfy latency constraints associated with the LL-PPDU.

Such latency reduction schemes, however, may be subject to data loss or performance degradation as a result of terminating non-low-latency PPDUs. For example, if the wireless device interrupts a non-low-latency PPDU at an arbitrary location, any remaining data of the PPDU may not be transmitted. Moreover, to detect arbitrary insertion of LL-PPDUs, a receiving wireless device may need to constantly monitor for LL-PPDUs, which may significantly increase power consumption at the receiving wireless device. In another example, the wireless device may insert the LL-PPDU according to a fixed time interval. Here, the receiving wireless device may conserve some power by only monitoring for the LL-PPDU at the fixed time interval. However, throughput may significantly decrease if the fixed time interval does not align with a coding boundary or a segment boundary of the non-low-latency PPDU.

Accordingly, the present disclosure provides PHY designs that may accommodate latency reduction schemes. Various aspects discussed herein relate generally to wireless communication and more particularly to PHY latency reduction. Some aspects more specifically relate to PPDU designs that support inserting low-latency traffic into a TXOP occupied by non-low-latency traffic. In some implementations, during a TXOP, an access point (AP) may output an A-PPDU according to an A-PPDU format. For example, the A-PPDU format may enable and/or support aggregation of multiple PPDUs in a time domain, in a frequency domain, or both. The A-PPDU may include an A-PPDU header and one or more A-PPDU subframes in accordance with the A-PPDU format. The A-PPDU header may include a PHY preamble and an indication of a PPDU type, a time interval indication for inserting low-latency traffic, a length of the A-PPDU, or a combination thereof. The AP may obtain, from an application layer, an LL-PPDU subframe that is associated with latency-sensitive traffic, and may insert the LL-PPDU subframe in place of at least one of the one or more A-PPDU subframes. The AP may output the LL-PPDU subframe during the TXOP to satisfy latency constraints associated with the LL-PPDU subframe.

A wireless station (STA) receiving the A-PPDU header and the one or more A-PPDU subframes according to the A-PPDU format may detect the presence of the LL-PPDU subframe, for example, in accordance with the A-PPDU header. The STA may terminate decoding of a final A-PPDU subframe of the one or more A-PPDU subframes prior to receiving and decoding the LL-PPDU subframe. In some implementations, the AP may insert the LL-PPDU subframe in accordance with a time interval indication, such as the periodic time interval indicated in the A-PPDU header, while in other examples, the AP may insert the LL-PPDU subframe at a segment boundary of the one or more A-PPDU subframes. In some implementations, the LL-PPDU subframe and each A-PPDU subframe of the one or more A-PPDU subframes may include a respective midamble (e.g., at least one symbol that includes detection and synchronization information, such as a short training field (STF)) that accommodates packet detection, automatic gain control (AGC) setting, synchronization information, and channel estimation for the STA. In some aspects, the A-PPDU may be aggregated in the time domain and in a frequency domain.

Particular aspects of the subject matter described in this disclosure can be implemented to realize one or more of the following potential advantages. The described techniques may accommodate latency reduction schemes by outputting A-PPDU subframes of an A-PPDU according to an A-PPDU format optimized for insertion of low-latency traffic. More specifically, the A-PPDU format may support LL-PPDU subframe insertion with reduced overhead, reduced latency, and reduced power consumption. For example, by inserting LL-PPDU subframes at a segment boundary in accordance with the A-PPDU format, the AP and the STA may avoid data loss associated with arbitrary insertion of LL-PPDU subframes. Additionally, insertion of LL-PPDU subframes at a periodic time interval may reduce power consumption at the STA, as the STA may enable packet detection at the periodic time interval associated with LL-PPDU subframe insertion, for example, rather than continuously monitoring for an LL-PPDU subframe. Further, by supporting A-PPDU subframes that are aggregated in the time domain and the frequency domain, and by including a midamble in each A-PPDU subframe, the AP may insert LL-PPDU subframes for multiple receiving STAs, and each A-PPDU subframe may be processed at the STA with reduced hardware complexity. Accordingly, the techniques described herein support reduced delays and improvements in satisfying latency constraints for low-latency traffic.

FIG. 1 shows a pictorial diagram of an example wireless communication network 100. According to some aspects, the wireless communication network 100 can be an example of a wireless local area network (WLAN) such as a Wi-Fi network (and will hereinafter be referred to as WLAN 100). For example, the WLAN 100 can be a network implementing at least one of the IEEE 802.11 family of wireless communication protocol standards (such as that defined by the IEEE 802.11-2020 specification or amendments thereof including, but not limited to, 802.11ay, 802.11ax, 802.11az, 802.11ba, 802.11bd, 802.11be, 802.11bf, and the 802.11 amendment associated with Wi-Fi 8 (e.g., 802.11bn)). The WLAN 100 may include numerous wireless communication devices such as a wireless AP 102 and multiple wireless STAs1. While only one AP 102 is shown in FIG. 1, the WLAN network 100 also can include multiple APs 102. AP 102 shown in FIG. 1 can represent various different types of APs including but not limited to enterprise-level APs, single-frequency APs, dual-band APs, standalone APs, software-enabled APs (soft APs), and multi-link APs. The coverage area and capacity of a cellular network (such as LTE, 5G NR, etc.) can be further improved by a small cell which is supported by an AP 102 serving as a miniature base station. Furthermore, private cellular networks also can be set up through a wireless area network using small cells.

Each of the STAs 104 also may be referred to as a mobile station (MS), a mobile device, a mobile handset, a wireless handset, an access terminal (AT), a user equipment (UE), a subscriber station (SS), or a subscriber unit, among other examples. The STAs 104 may represent various devices such as mobile phones, personal digital assistant (PDAs), other handheld devices, netbooks, notebook computers, tablet computers, laptops, chromebooks, extended reality (XR) headsets, wearable devices, display devices (for example, TVs (including smart TVs), computer monitors, navigation systems, among others), music or other audio or stereo devices, remote control devices ("remotes"), printers, kitchen appliances (including smart refrigerators) or other household appliances, key fobs (for example, for passive keyless entry and start (PKES) systems), Internet of Things (IoT) devices, and vehicles, among other examples. The various STAs 104 in the network are able to communicate with one another via the AP 102.

A single AP 102 and an associated set of STAs 104 may be referred to as a basic service set (BSS), which is managed by the respective AP 102. FIG. 1 additionally shows an example coverage area 108 of the AP 102, which may represent a basic service area (BSA) of the WLAN 100. The BSS may be identified or indicated to users by a service set identifier (SSID), as well as to other devices by a basic service set identifier (BSSID), which may be a medium access control (MAC) address of the AP 102. The AP 102 may periodically broadcast beacon frames ("beacons") including the BSSID to enable any STAs 104 within wireless range of the AP 102 to "associate" or re-associate with the AP 102 to establish a respective communication link 106 (hereinafter also referred to as a "Wi-Fi link"), or to maintain a communication link 106, with the AP 102. For example, the beacons can include an identification or indication of a primary channel used by the respective AP 102 as well as a timing synchronization function for establishing or maintaining timing synchronization with the AP 102. The AP 102 may provide access to external networks to various STAs 104 in the WLAN via respective communication links 106.

To establish a communication link 106 with an AP 102, each of the STAs 104 is configured to perform passive or active scanning operations ("scans") on frequency channels in one or more frequency bands (for example, the 2.4 GHZ, 5 GHZ, 6 GHz or 60 GHz bands).

The APs 102 and STAs 104 may function and communicate (via the respective communication links 106) according to one or more of the IEEE 802.11 family of wireless communication protocol standards. These standards define the WLAN radio and baseband protocols for the PHY and MAC layers. The APs 102 and STAs 104 transmit and receive wireless communications (hereinafter also referred to as "Wi-Fi communications" or "wireless packets") to and from one another in the form of PHY protocol data units (PPDUs). The APs 102 and STAs 104 in the WLAN 100 may transmit PPDUs over an unlicensed spectrum, which may be a portion of spectrum that includes frequency bands traditionally used by Wi-Fi technology, such as the 2.4 GHZ band, the 5 GHz band, the 60 GHz band, the 3.6 GHz band, and the 900 MHz band. Some examples of the APs 102 and STAs 104 described herein also may communicate in other frequency bands, such as the 5.9 GHZ and the 6 GHz bands, which may support both licensed and unlicensed communications. The APs 102 and STAs 104 also can communicate over other frequency bands such as shared licensed frequency bands, where multiple operators may have a license to operate in the same or overlapping frequency band or bands.

Each of the frequency bands may include multiple sub-bands or frequency channels. For example, PPDUs conforming to the IEEE 802.11n, 802.11ac, 802.11ax and 802.11be standard amendments may be transmitted over the 2.4 GHZ, 5 GHZ or 6 GHz bands, each of which is divided into multiple 20 MHz channels. As such, these PPDUs are transmitted over a physical channel having a minimum bandwidth of 20 MHz, but larger channels can be formed through channel bonding. For example, PPDUs may be transmitted over physical channels having bandwidths of 40 MHZ, 80 MHz, 160 or 320 MHz by bonding together multiple 20 MHz channels.

Each PPDU is a composite structure that includes a PHY preamble and a payload in the form of a PHY service data unit (PSDU). The information provided in the preamble may be used by a receiving device to decode the subsequent data in the PSDU. In instances in which PPDUs are transmitted over a bonded channel, the preamble fields may be duplicated and transmitted in each of the multiple component channels. The PHY preamble may include both a legacy portion (or "legacy preamble") and a non-legacy portion (or "non-legacy preamble"). The legacy preamble may be used for packet detection, automatic gain control and channel estimation, among other uses. The legacy preamble also may generally be used to maintain compatibility with legacy devices. The format of, coding of, and information provided in the non-legacy portion of the preamble is associated with the particular IEEE 802.11 protocol to be used to transmit the payload.

Figure 2:
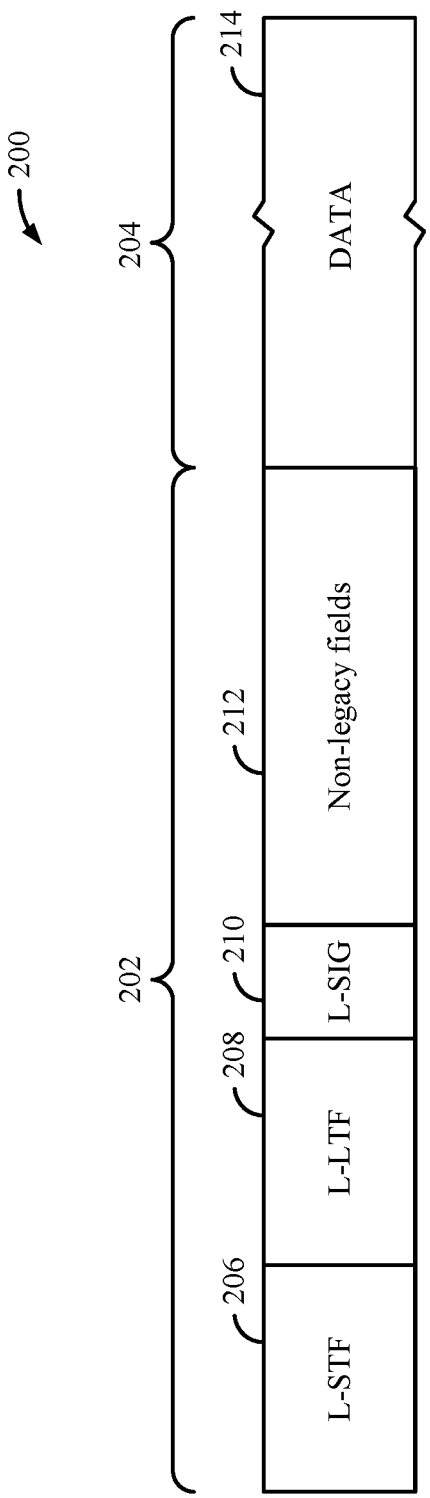
FIG. 2 shows an example protocol data unit (PDU) usable for communications between a wireless access point (AP) and one or more wireless stations (STAs).

FIG. 2 shows an example protocol data unit (PDU) 200 usable for wireless communication between a wireless AP 102 and one or more wireless STAs 104. For example, the PDU 200 can be configured as a PPDU. As shown, the PDU 200 includes a PHY preamble 202 and a PHY payload 204. For example, the preamble 202 may include a legacy portion that itself includes a legacy short training field (L-STF) 206, which may consist of two symbols, a legacy long training field (L-LTF) 208, which may consist of two symbols, and a legacy signal field (L-SIG) 210, which may consist of two symbols. The legacy portion of the preamble 202 may be configured according to the IEEE 802.11a wireless communication protocol standard. The preamble 202 also may include a non-legacy portion including one or more non-legacy fields 212, for example, conforming to one or more of the IEEE 802.11 family of wireless communication protocol standards.

The L-STF 206 generally enables a receiving device to perform coarse timing and frequency tracking and automatic gain control (AGC). The L-LTF 208 generally enables a receiving device to perform fine timing and frequency tracking and also to perform an initial estimate of the wireless channel. The L-SIG 210 generally enables a receiving device to determine (for example, obtain, select, identify, detect, ascertain, calculate, or compute) a duration of the PDU and to use the determined duration to avoid transmitting on top of the PDU. The legacy portion of the preamble, including the L-STF 206, the L-LTF 208 and the L-SIG 210, may be modulated according to a binary phase shift keying (BPSK) modulation scheme. The payload 204 may be modulated according to a BPSK modulation scheme, a quadrature BPSK (Q-BPSK) modulation scheme, a quadrature amplitude modulation (QAM) modulation scheme, or another appropriate modulation scheme. The payload 204 may include a PSDU including a data field (DATA) 214 that, in turn, may carry higher layer data, for example, in the form of MAC protocol data units (MPDUs) or an aggregated MPDU (A-MPDU).

The PDU 200 may be an example of a PPDU output by a wireless device, such as an AP 102 or a STA 104, according to an A-PPDU format optimized for insertion of low-latency traffic. In some implementations, the PDU 200 may be an example of an LL-PPDU carrying low-latency traffic obtained by the wireless device during a TXOP that is occupied by non-low-latency traffic. In accordance with the present disclosure, the wireless device may not wait to output the PDU 200 until the TXOP ends; instead, the wireless device may output the PDU 200 during the TXOP and in accordance with the A-PPDU format. For example, the wireless device may insert the PDU 200 into an A-PPDU at a location defined by the A-PPDU format, or may insert the PDU 200 into the A-PPDU in place of a non-low-latency PPDU, which may enable the wireless device to satisfy latency constraints of the low-latency traffic.

Alternatively, the PDU 200 may be an example of a non-low-latency PPDU that carries non-low-latency traffic output by the wireless device during the TXOP. The PDU 200 may be aggregated, in a time domain, with one or more other PPDUs concatenated or otherwise combined into an A-PPDU, such that the PDU 200 and the one or more other PPDUs are output in a single transmission during the TXOP. When the wireless device obtains low-latency traffic during the TXOP, such as an LL-PPDU, the wireless device may insert the LL-PPDU prior to or subsequent to the PDU 200, such that the LL-PPDU is output by the wireless device during the TXOP. In some implementations, the wireless device may preempt the PDU 200 with the LL-PPDU, where the wireless device may output the LL-PPDU in place of the PDU 200. For example, the wireless device may terminate or otherwise end the output of the PDU 200 and may immediately begin outputting the LL-PPDU.

Based on the A-PPDU format associated with low-latency traffic insertion, the PHY preamble 202 may include one or more fields. For example, the L-STF 206, the L-LTF 208, and the L-SIG 210 may include or be examples of ultra-high-reliability (UHR) fields associated with or otherwise utilized for low-latency traffic insertion detection, such as a UHR-STF, a UHR-LTF, and a UHR-SIG, respectively. Additionally, or alternatively, the PHY preamble 202 may not include one or more fields based on a location of the PDU 200 in a sequence of PPDUs in the A-PPDU. For example, and as discussed in greater detail with reference to FIG. 5, the preamble 202 may not include the L-STF 206 or a UHR-STF when the PDU 200 is an initial PPDU of the A-PPDU. In some implementations, the PDU 200 may include a break indication symbol, for example, subsequent to the PHY payload 204.

Figure 3:
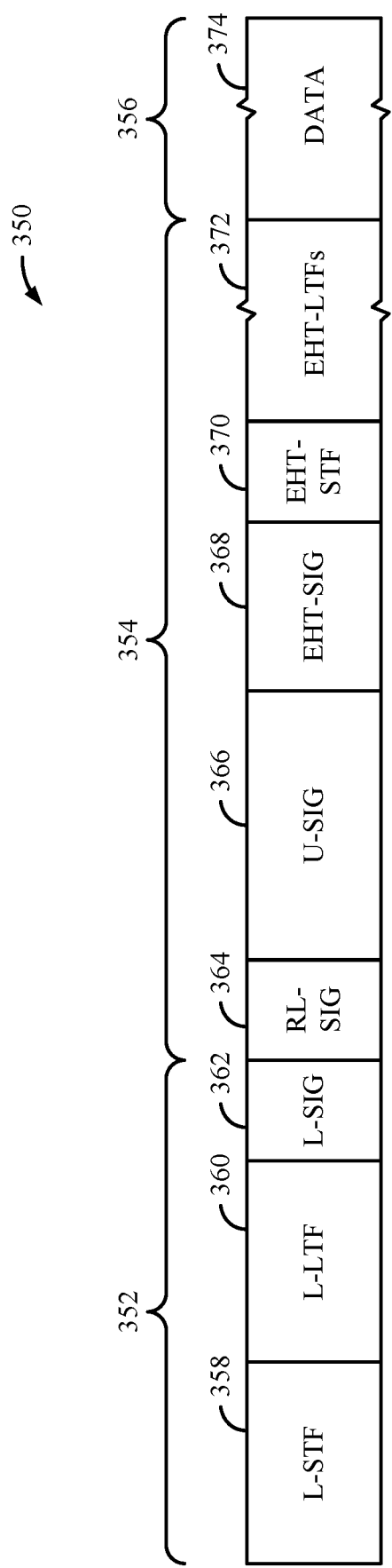
FIG. 3 shows an example physical layer (PHY) protocol data unit (PPDU) usable for communications between a wireless AP and one or more wireless STAs.

FIG. 3 shows another example PPDU 350 usable for wireless communication between a wireless AP 102 and one or more wireless STAs 104. The PPDU 350 may be used for SU, OFDMA, or MU-MIMO transmissions. The PPDU 350 may be formatted as an Extremely High Throughput (EHT) WLAN PPDU in accordance with the IEEE 802.11be amendment to the IEEE 802.11 family of wireless communication protocol standards, or may be formatted as a PPDU conforming to any later (post-EHT) version of a new wireless communication protocol conforming to a future IEEE 802.11 wireless communication protocol standard, such as the 802.11 amendment associated with Wi-Fi 8 (i.e., 802.11bn), or another wireless communication standard. The PPDU 350 includes a PHY preamble including a legacy portion 352 and a non-legacy portion 354. The PPDU 350 may further include a PHY payload 356 after the preamble, for example, in the form of a PSDU including a data field 374.

The legacy portion 352 of the preamble includes an L-STF 358, an L-LTF 360, and an L-SIG 362. The non-legacy portion 354 of the preamble includes a repetition of L-SIG (RL-SIG) 364 and multiple wireless communication protocol version-dependent signal fields after RL-SIG 364. For example, the non-legacy portion 354 may include a universal signal field 366 (referred to herein as "U-SIG 366") and an EHT signal field 368 (referred to herein as "EHT-SIG 368"). The presence of RL-SIG 364 and U-SIG 366 may indicate to EHT- or later version-compliant STAs 104 that the PPDU 350 is an EHT PPDU or a PPDU conforming to any later (post-EHT) version of a new wireless communication protocol conforming to a future IEEE 802.11 wireless communication protocol standard. One or both of U-SIG 366 and EHT-SIG 368 may be structured as, and carry version-dependent information for, other wireless communication protocol versions associated with amendments to the IEEE family of standards beyond EHT. For example, U-SIG 366 may be used by a receiving device to interpret bits in one or more of EHT-SIG 368 or the data field 374. Like L-STF 358, L-LTF 360, and L-SIG 362, the information in U-SIG 366 and EHT-SIG 368 may be duplicated and transmitted in each of the component 20 MHz channels in instances involving the use of a bonded channel.

The non-legacy portion 354 further includes an additional short training field 370 (referred to herein as "EHT-STF 370," although it may be structured as, and carry version-dependent information for, other wireless communication protocol versions beyond EHT) and one or more additional long training fields 372 (referred to herein as "EHT-LTFs 372," although they may be structured as, and carry version-dependent information for, other wireless communication protocol versions beyond EHT). EHT-STF 370 may be used for timing and frequency tracking and AGC, and EHT-LTF 372 may be used for more refined channel estimation.

EHT-SIG 368 may be used by an AP 102 to identify and inform one or multiple STAs 104 that the AP 102 has scheduled UL or DL resources for them. EHT-SIG 368 may be decoded by each compatible STA 104 served by the AP 102. EHT-SIG 368 may generally be used by a receiving device to interpret bits in the data field 374. For example, EHT-SIG 368 may include RU allocation information, spatial stream configuration information, and per-user (for example, STA-specific) signaling information. Each EHT-SIG 368 may include a common field and at least one user-specific field. In the context of OFDMA, the common field can indicate RU distributions to multiple STAs 104, indicate the RU assignments in the frequency domain, indicate which RUs are allocated for MU-MIMO transmissions and which RUs correspond to OFDMA transmissions, and the number of users in allocations, among other examples. The user-specific fields are assigned to particular STAs 104 and carry STA-specific scheduling information such as user-specific MCS values and user-specific RU allocation information. Such information enables the respective STAs 104 to identify and decode corresponding RUs in the associated data field 374.

In accordance with the present disclosure, the PPDU 350 may be an example of a PPDU output by a wireless device, such as an AP 102 or a STA 104, according to an A-PPDU format optimized for insertion of low-latency traffic. In some implementations, the PPDU 350 may be an example of an LL-PPDU carrying low-latency traffic obtained by the wireless device during a TXOP that is occupied by non-low-latency traffic. The wireless device may output the PPDU 350 during the TXOP and in accordance with the A-PPDU format. For example, the wireless device may insert the PPDU 350 into an A-PPDU at a location defined by the A-PPDU format or according to a periodic time interval. Alternatively, the wireless device may insert the PPDU 350 into the A-PPDU in place of a non-low-latency PPDU.

In some other implementations, the PPDU 350 may be an example of a PPDU carrying non-low-latency traffic. The PPDU 350 may be aggregated, in a time domain, with one or more other PPDUs concatenated or otherwise combined into an A-PPDU, such that the PPDU 350 and the one or more other PPDUs are output in a single transmission during a same TXOP. In some implementations, the PPDU 350 and the one or more other PPDUs may be further aggregated in a frequency domain, and the A-PPDU may be referred to as a two-dimensional A-PPDU. The A-PPDU may be structured in accordance with the A-PPDU format such that low-latency traffic, such as an LL-PPDU, may be inserted into the A-PPDU at a predefined or preconfigured location or according to a periodic time interval. When the wireless device obtains low-latency traffic during the TXOP, such as an LL-PPDU, the wireless device may insert the LL-PPDU prior to or subsequent to the PPDU 350. In some implementations, the wireless device may preempt the PPDU 350 with the LL-PPDU, where the wireless device may output the LL-PPDU in place of the PPDU 350. For example, the wireless device may terminate or otherwise end the output of the PPDU 350 and may immediately begin outputting the LL-PPDU.

The PHY preamble, including the legacy portion 352 and the non-legacy portion 354, may include one or more fields in accordance with the A-PPDU format associated with low-latency traffic insertion. In some implementations, an A-PPDU header of the A-PPDU may include an L-STF, an L-LTF, and an L-SIG, and as such, the PPDU 350 may not include the legacy portion 352. Additionally, the A-PPDU header may include an RL-SIG and a U-SIG, and the PPDU 350 may not include the RL-SIG 364 or the U-SIG 366. The non-legacy portion 354 may include one or more of a UHR-SIG, a UHR-STF, and a UHR-LTF, in place of or in addition to the EHT-SIG 368, the EHT-STF 370, and the EHT-LTFs 372, respectively. In some implementations, the PPDU 350 may include a break indication symbol, for example, subsequent to the PHY payload 356.

The operating bandwidth also may accommodate concurrent operation on other unlicensed frequency bands (such as the 6 GHz band) and a portion of spectrum that includes frequency bands traditionally used by Wi-Fi technology. In noncontiguous examples, the operating bandwidth may span one or more disparate sub-channel sets. For example, the 320 MHz bandwidth may be contiguous and located in the same 6 GHz band or noncontiguous and located in different bands (such as partly in the 5 GHz band and partly in the 6 GHz band).

In some implementations, operability enhancements associated with EHT and newer generations of the IEEE 802.11 family of wireless communication protocols, and in particular operation at an increased bandwidth, may include refinements to carrier sensing and signal reporting mechanisms. Such techniques may include modifications to existing rules, structure, or signaling implemented for legacy systems.

Figure 4:
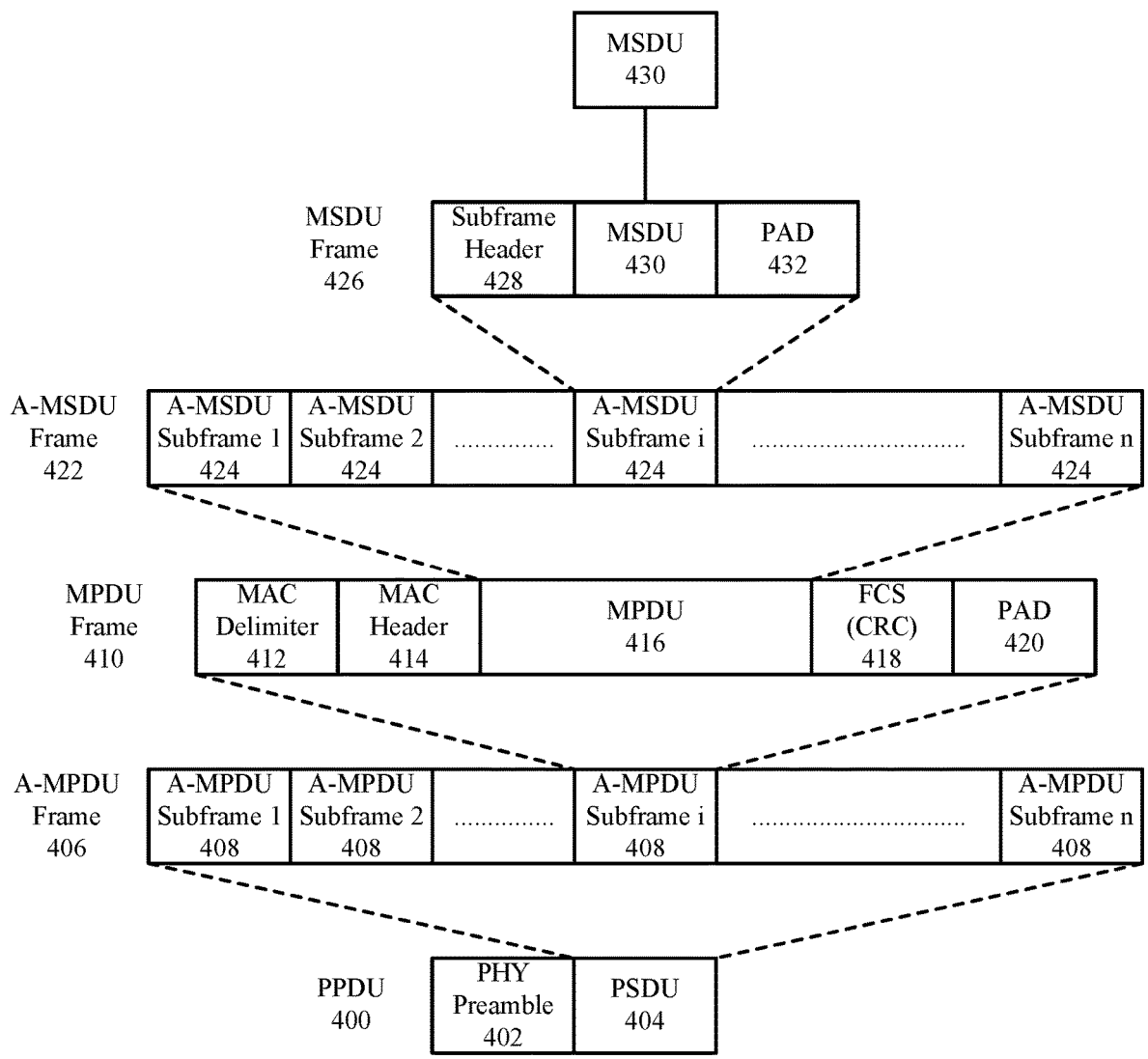
FIG. 4 shows a hierarchical format of an example PPDU usable for communications between a wireless AP and one or more wireless STAs.

FIG. 4 shows a hierarchical format of an example PPDU usable for communications between a wireless AP 102 and one or more wireless STAs 104. As described, each PPDU 400 includes a PHY preamble 402 and a PSDU 404. Each PSDU 404 may represent (or "carry") one or more MAC protocol data units (MPDUs) 416. For example, each PSDU 404 may carry an aggregated MPDU (A-MPDU) 406 that includes an aggregation of multiple A-MPDU subframes 408. Each A-MPDU subframe 406 may include an MPDU frame 410 that includes a MAC delimiter 412 and a MAC header 414 prior to the accompanying MPDU 416, which includes the data portion ("payload" or "frame body") of the MPDU frame 410. Each MPDU frame 410 also may include a frame check sequence (FCS) field 418 for error detection (for example, the FCS field may include a cyclic redundancy check (CRC)) and padding bits 420. The MPDU 416 may carry one or more MAC service data units (MSDUs) 416. For example, the MPDU 416 may carry an aggregated MSDU (A-MSDU) 422 including multiple A-MSDU subframes 424. Each A-MSDU subframe 424 contains a corresponding MSDU 430 preceded by a subframe header 428 and in some aspects followed by padding bits 432.

Referring back to the MPDU frame 410, the MAC delimiter 412 may serve as a marker of the start of the associated MPDU 416 and indicate the length of the associated MPDU 416. The MAC header 414 may include multiple fields containing information that defines or indicates characteristics or attributes of data encapsulated within the frame body 416. The MAC header 414 includes a duration field indicating a duration extending from the end of the PPDU until at least the end of an acknowledgment (ACK) or Block ACK (BA) of the PPDU that is to be transmitted by the receiving wireless communication device. The use of the duration field serves to reserve the wireless medium for the indicated duration, and enables the receiving device to establish its network allocation vector (NAV). The MAC header 414 also includes one or more fields indicating addresses for the data encapsulated within the frame body 416. For example, the MAC header 414 may include a combination of a source address, a transmitter address, a receiver address or a destination address. The MAC header 414 may further include a frame control field containing control information. The frame control field may specify a frame type, for example, a data frame, a control frame, or a management frame.

Some APs 102 and STAs 104 may implement techniques for spatial reuse that involve participation in a coordinated communication scheme. According to such techniques, an AP 102 may contend for access to a wireless medium to obtain control of the medium for a TXOP. The AP 102 that wins the contention (hereinafter also referred to as a "sharing AP") may select one or more other APs 102 (hereinafter also referred to as "shared APs") to share resources of the TXOP. The sharing and shared APs 102 may be located in proximity to one another such that at least some of their wireless coverage areas at least partially overlap. Some examples may specifically involve coordinated AP TDMA or OFDMA techniques for sharing the time or frequency resources of a TXOP. To share its time or frequency resources, the sharing AP 102 may partition the TXOP into multiple time segments or frequency segments each including respective time or frequency resources representing a portion of the TXOP. The sharing AP 102 may allocate the time or frequency segments to itself or to one or more of the shared APs 102. For example, each shared AP 102 may utilize a partial TXOP assigned by the sharing AP 102 for its uplink or downlink communications with its associated STAs 104.

In some implementations of such TDMA techniques, each portion of a plurality of portions of the TXOP includes a set of time resources that do not overlap with any time resources of any other portion of the plurality of portions. In such examples, the scheduling information may include an indication of time resources, of multiple time resources of the TXOP, associated with each portion of the TXOP. For example, the scheduling information may include an indication of a time segment of the TXOP such as an indication of one or more slots or sets of symbol periods associated with each portion of the TXOP such as for multi-user TDMA.

In some other examples of OFDMA techniques, each portion of the plurality of portions of the TXOP includes a set of frequency resources that do not overlap with any frequency resources of any other portion of the plurality of portions. In such implementations, the scheduling information may include an indication of frequency resources, of multiple frequency resources of the TXOP, associated with each portion of the TXOP. For example, the scheduling information may include an indication of a bandwidth portion of the wireless channel such as an indication of one or more subchannels or resource units (RUs) associated with each portion of the TXOP such as for multi-user OFDMA.

In this manner, the sharing AP's acquisition of the TXOP enables communication between one or more additional shared APs 102 and their respective BSSs, subject to appropriate power control and link adaptation. For example, the sharing AP 102 may limit the transmit powers of the selected shared APs 102 such that interference from the selected APs 102 does not prevent STAs 104 associated with the TXOP owner from successfully decoding packets transmitted by the sharing AP 102. Such techniques may be used to reduce latency because the other APs 102 may not need to wait to win contention for a TXOP to be able to transmit and receive data according to conventional CSMA/CA or EDCA techniques. Additionally, by enabling a group of APs 102 associated with different BSSs to participate in a coordinated AP transmission session, during which the group of APs 102 may share at least a portion of a single TXOP obtained by any one of the participating APs 102, such techniques may increase throughput across the BSSs associated with the participating APs 102 and also may achieve improvements in throughput fairness. Furthermore, with appropriate selection of the shared APs 102 and the scheduling of their respective time or frequency resources, medium utilization may be maximized or otherwise increased while packet loss resulting from OBSS interference is minimized or otherwise reduced. Various implementations may achieve these and other advantages without requiring that the sharing AP 102 or the shared APs 102 be aware of the STAs 104 associated with other BSSs, without requiring a preassigned or dedicated master AP 102 or preassigned groups of APs 102, and without requiring backhaul coordination between the APs 102 participating in the TXOP.

In some implementations, the PPDU 400 may be an example of an LL-PPDU obtained by the wireless device during a TXOP that is occupied by non-low-latency traffic. The wireless device may output the PPDU 400 during the TXOP and in accordance with an A-PPDU format. For example, the wireless device may insert the PPDU 400 into an A-PPDU at a location defined by the A-PPDU format or according to a periodic time interval. Alternatively, the wireless device may insert the PPDU 400 into the A-PPDU in place of a non-low-latency PPDU.

In some other implementations, the PPDU 400 may be an example of a non-low-latency PPDU that is aggregated, in a time domain, with one or more other PPDUs as part of an A-PPDU. The PPDU 400 and the one or more other PPDUs may be output via a same subchannel of a wireless channel. In some implementations, the PPDU 400 and the one or more other PPDUs may be further aggregated in a frequency domain, and the A-PPDU may be referred to as a two-dimensional A-PPDU. Here, the PPDU 400 and the one or more other PPDUs may be output via respective subchannels of a set of subchannels of the wireless channel.

The A-PPDU may be structured in accordance with an A-PPDU format as described herein such that low-latency traffic, such as an LL-PPDU, may be inserted into the A-PPDU at a predefined or preconfigured location or according to a periodic time interval. The A-PPDU may include an A-PPDU header and a sequence of PPDUs including the PPDU 400. The wireless device may obtain low-latency traffic, such as an LL-PPDU, during the TXOP. Based on the A-PPDU format, the wireless device may insert the LL-PPDU prior to or subsequent to the PPDU 400. In some implementations, the wireless device may terminate or otherwise end the output of the PPDU 400 and may immediately begin outputting the LL-PPDU.

Figure 5:
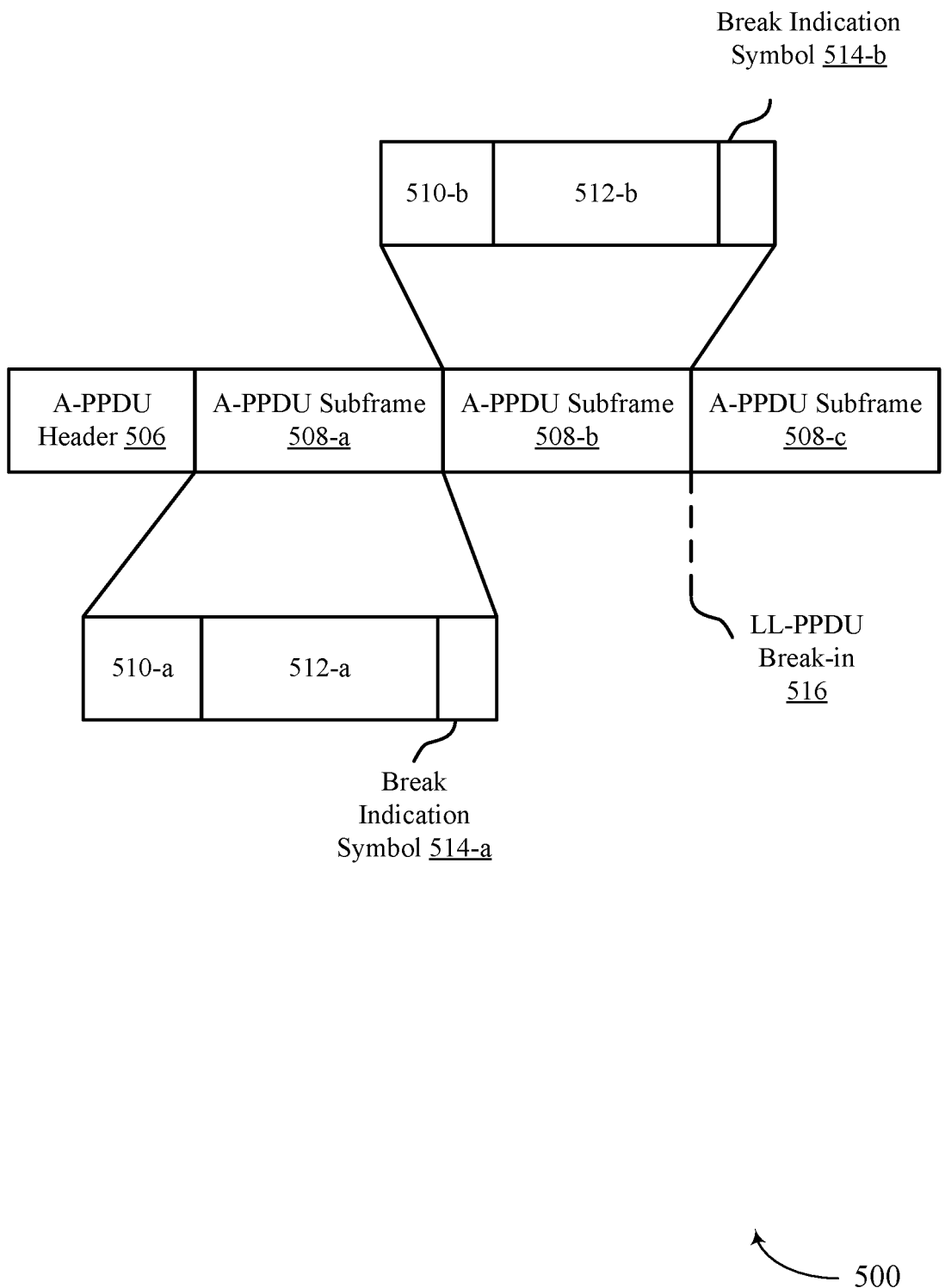
FIG. 5 shows an example of a time-domain aggregated PPDU (TD A-PPDU) usable for communications between a wireless AP and one or more wireless STAs that support PHY latency reduction.

FIG. 5 shows an example of a time-domain aggregated PPDU (TD A-PPDU) 500 usable for communications between a wireless AP and one or more wireless STAs that support PHY latency reduction. The TD A-PPDU 500 may be implemented by aspects of the wireless communication network 100. For example, the TD A-PPDU 500 may be communicated between wireless communication devices, such as between an AP and a STA as described with reference to FIG. 1.

In some implementations, the AP and the STA may support TXOP sharing policies that enable latency-sensitive traffic to be included in a TXOP along with non-latency-sensitive traffic. As discussed herein, latency-sensitive traffic may refer to or be understood as wireless communications associated with latency-sensitive applications and having various latency, throughput, and timing constraints. For example, an LL-PPDU may refer to a PPDU originating from a latency-sensitive application and may be associated with relatively low latency requirements or constraints. Accordingly, the TD A-PPDU 500 may have an A-PPDU format associated with low-latency traffic insertion as described herein.

The TD A-PPDU 500 may be an example of an A-PPDU that is aggregated in a time domain such that two or more PPDUs are concatenated or otherwise combined into a single transmission, for example, output by the AP. Thus, the TD A-PPDU 500 may enable time division multiple access (TDMA) for communications between the AP and the STA. The two or more PPDUs may be output via a same subchannel of a wireless channel and may be referred to as A-PPDUs or A-PPDU subframes (such as A-PPDU subframes 508). As illustrated, the TD A-PPDU 500 includes an A-PPDU header 506 and a sequence of A-PPDU subframes 508, which may be examples of non-latency-sensitive traffic. The AP and the STA may identify a TXOP for communication via the subchannel. The AP may output, and the STA may receive, the TD A-PPDU 500 during the TXOP.

When the AP obtains latency-sensitive traffic, such as an LL-PPDU subframe obtained from an application layer of the AP, the AP may preempt at least one A-PPDU subframe 508 of the TD A-PPDU 500 to satisfy constraints of the latency-sensitive traffic. Preempting an A-PPDU subframe 508 may involve the AP outputting the LL-PPDU subframe in place of the at least one A-PPDU subframe 508, which also may be referred to as "inserting," "breaking in," or "cutting in" the LL-PPDU subframe. In some implementations, the AP may insert the LL-PPDU subframe at an arbitrary location within the TD A-PPDU 500. For example, the AP may terminate or otherwise end the output of the at least one A-PPDU subframe 508 and may immediately begin outputting the LL-PPDU subframe. In other examples, the AP may insert the LL-PPDU subframe at a periodic time interval (such as every n milliseconds (ms)) associated with inserting low-latency traffic, or may insert the LL-PPDU subframe at a segment boundary (such as a symbol boundary, a PPDU boundary, or an MPDU boundary) between the at least one A-PPDU subframe 508 and a subsequent A-PPDU subframe 508.

Additionally, or alternatively, the AP may communicate with multiple STAs. In such cases, each A-PPDU subframe 508 may be addressed to a respective STA. For example, the AP may output a A-PPDU subframe 508-a to a first STA and may output a A-PPDU subframe 508-b to a second STA. Each LL-PPDU subframe obtained by the AP may be addressed to the first STA or the second STA. As such, when the AP inserts an LL-PPDU subframe after an A-PPDU subframe 508, the LL-PPDU subframe may be addressed to a STA different from the STA associated with the A-PPDU subframe 508. Thus, the techniques described herein support low-latency traffic insertion for different receiving STAs or for a single receiving STA. For example, the TD A-PPDU 500, the A-PPDU header 506, and each A-PPDU subframe 508 may have respective formats associated with low-latency traffic insertion in A-PPDUs as described herein.

For example, the A-PPDU header 506 may include a legacy preamble, such as a legacy PHY preamble. The A-PPDU header 506 may be associated with each of the A-PPDU subframes 508, and as such, may indicate parameters common to all of the A-PPDU subframes 508. The A-PPDU header 506 may include a legacy STF, a legacy LTF, a legacy SIG, an RL-SIG, and a U-SIG. Additionally, the A-PPDU header 506 may include an indication of a PPDU type, an indication of a periodic time interval associated with inserting low-latency traffic (such as LL-PPDUs), or a combination thereof. In some aspects, the A-PPDU header 506 may further indicate an insertion mode, such as whether the TD A-PPDU 500 supports insertion of low-latency traffic (such as LL-PPDUs). For example, the AP may determine, at the MAC layer, whether insertion of low-latency traffic is supported, and the A-PPDU header 506 may indicate an insertion mode in accordance with the determination at the MAC layer. In some implementations, the A-PPDU header 506 also may indicate a length of the TD A-PPDU 500, which may refer to a duration (such as a time duration) of the entire TD A-PPDU 500.

The indication of the PPDU type, the indication of the periodic time interval, and the indication of the insertion mode may, in some implementations, be included within a SIG field of the A-PPDU header 506, such as the U-SIG field. The indication of the PPDU type may indicate whether the PPDU with which the A-PPDU header 506 is associated is an A-PPDU or a PPDU. In the example of FIG. 5, the indication of the PPDU type may indicate that the TD A-PPDU 500 is an A-PPDU. The indication of the periodic time interval associated with inserting low-latency traffic may indicate a fixed time interval at which LL-PPDUs, if any, may be inserted into the TD A-PPDU 500.

Each A-PPDU subframe 508 subsequent to the A-PPDU header 506 may include a preamble 510 and a data field 512. In some aspects, one or more fields may be included in a preamble 510 of an A-PPDU subframe 508 according to a location of the A-PPDU subframe 508 in the sequence of A-PPDU subframes 508 and based on the format associated with low-latency traffic insertion for A-PPDUs. For example, the A-PPDU subframe 508-a may be an initial A-PPDU subframe 508 in the sequence of A-PPDU subframes 508, and as such, may include a preamble 510-a that includes at least one UHR-LTF and a UHR-SIG. In some implementations, the A-PPDU subframe 508-a may include multiple UHR-LTFs, for example, according to number of data streams associated with the TD A-PPDU 500. The A-PPDU subframe 508-a may include a data field 512-a subsequent to the preamble 510-a. In some implementations, the A-PPDU subframe 508-a may further include a break indication symbol 514-a.

Each A-PPDU subframe 508 subsequent to the initial A-PPDU subframe 508 may include a preamble 510 that includes a UHR-LTF and a UHR-SIG, as well as a UHR-STF associated with or otherwise utilized for low-latency traffic insertion detection. That is, the initial A-PPDU subframe 508, such as the A-PPDU subframe 508-a, may not be used for LL-PPDU subframe insertion, and may therefore not include a UHR-STF. A STA receiving the TD A-PPDU 500 may detect the initial A-PPDU subframe 508 by detecting the A-PPDU header 506, for example, by utilizing the STF field in the legacy preamble in the A-PPDU header 506. In some implementations, each A-PPDU subframe 508 subsequent to the initial A-PPDU subframe 508 may further include a break indication symbol 514. For example, an A-PPDU subframe 508-*b* may be subsequent to the A-PPDU subframe 508-*a*, and as such, may include a preamble 510-*b* carrying a UHR-STF, a UHR-LTF, and a UHR-SIG, a data field 512-*b*, and, in some cases, a break indication symbol 514-*b*. In some aspects, the STA may use the preamble 510-*b* to detect a new A-PPDU subframe 508 and synchronize with the AP.

In some implementations, the AP and the STA may be configured to support low-latency traffic insertion according to a periodic time interval. In such examples, when the AP obtains low-latency traffic, such as an LL-PPDU subframe, from an application layer, the AP may wait until a next occurrence of the periodic time interval before inserting the LL-PPDU subframe into the TD A-PPDU 500. The AP may continue to output A-PPDU subframes 508 while waiting for the next occurrence of the periodic time interval, which may be represented in FIG. 5 by LL-PPDU break-in 516. For example, the AP may output a first portion of a packet that includes the A-PPDU header 506, the A-PPDU subframe 508-*a*, and the A-PPDU subframe 508-*b*. The AP may obtain an LL-PPDU subframe during the A-PPDU subframe 508-*b*, but may wait until the LL-PPDU break-in 516 before inserting the LL-PPDU subframe. That is, the AP may finish outputting the A-PPDU subframe 508-*b* before inserting the LL-PPDU subframe. In some implementations, the AP may terminate A-PPDU subframe 508-*c* and may output the LL-PPDU subframe in place of the A-PPDU subframe 508-*c*. In other examples, the AP may output the A-PPDU subframe 508-*c* subsequent to outputting the LL-PPDU subframe. For example, the AP may output a second portion of the packet that includes the LL-PPDU subframe and the A-PPDU subframe 508-*c*.

In any case, the AP may output the LL-PPDU subframe in accordance with the format associated with low-latency insertion for A-PPDUs. For example, the LL-PPDU subframe may have a same format as the A-PPDU subframes 508, such that the LL-PPDU subframe includes a preamble carrying a UHR-STF, a UHR-LTF, and a UHR-SIG, as well as a data field. The UHR-STF may be associated with low-latency traffic detection. In accordance with the insertion mode, the STA may be configured to enable packet detection at each periodic time interval (that is, at each time interval boundary) to detect low-latency traffic insertions. As such, the STA may enable packet detection at the LL-PPDU break-in 516 and may detect the LL-PPDU subframe at the LL-PPDU break-in 516. The STA may receive and decode the LL-PPDU subframe in accordance with the A-PPDU header 506.

Alternatively, the AP and the STA may be configured to support low-latency traffic insertion according to the break indication symbols 514. Each A-PPDU subframe 508 may include a break indication symbol 514 that indicates that an upcoming A-PPDU subframe 508 is an LL-PPDU subframe. In some implementations, a break indication symbol 514 may be appended to each A-PPDU subframe 508, and may replace a packet extension symbol of the A-PPDU subframe 508. When the AP obtains an LL-PPDU subframe, the AP may output, in a break indication symbol 514 of an A-PPDU subframe 508 that occurs prior to outputting the LL-PPDU subframe, an indication that the LL-PPDU subframe is inserted in place of a subsequent A-PPDU subframe 508. That is, the AP may indicate, in the break indication symbol 514, whether a subsequent A-PPDU subframe 508 is to be preempted by a respective LL-PPDU subframe. For example, as illustrated in FIG. 5, the AP may indicate, in the break indication symbol 514-*a* of the A-PPDU subframe 508-*a*, that the subsequent A-PPDU subframe 508-*b* is not an LL-PPDU subframe. Additionally, the AP may indicate, in the break indication symbol 514-*b* of the A-PPDU subframe 508-*b*, that the subsequent A-PPDU subframe 508-*c* is to be preempted by an LL-PPDU subframe.

A receiving STA may check the break indication symbol 514 of each A-PPDU subframe 508 to determine whether a subsequent A-PPDU subframe 508 is to be preempted by an LL-PPDU subframe. For example, the STA may detect that the break indication symbol 514-*b* indicates that the A-PPDU subframe 508-*c* is to be preempted by an LL-PPDU subframe. Accordingly, the STA may terminate decoding the A-PPDU subframe 508-*b* to receive and decode the LL-PPDU subframe. The STA may receive the LL-PPDU subframe at the LL-PPDU break-in 516 and may decode the LL-PPDU subframe in accordance with the A-PPDU header 506 and its preamble.

Additionally, or alternatively, a receiving STA may detect an LL-PPDU subframe inserted into the TD A-PPDU 500 based on a UHR-STF included in the LL-PPDU subframe, a pilot polarity change, or a combination thereof. In a first example, a STA may detect an A-PPDU subframe 508 and may determine whether the A-PPDU subframe 508 is addressed to the STA, whether the A-PPDU subframe 508 is an LL-PPDU subframe, or both, by detecting the UHR-STF within the LL-PPDU subframe. The UHR-STF may be associated with low-latency traffic detection and may indicate that the LL-PPDU subframe is addressed to the receiving STA. In a second example, the receiving STA may determine whether there is a break-in A-PPDU subframe 508 or an LL-PPDU subframe by detecting a change in a polarity of one or more pilot signals included in the OFDM symbols in each A-PPDU subframe 508. In either example, if the STA determines that the A-PPDU subframe 508 is addressed to the STA, the STA may receive and decode the A-PPDU subframe 508. If the A-PPDU subframe 508 is not addressed to the STA, the STA may refrain from decoding the A-PPDU subframe 508.

Figure 6:
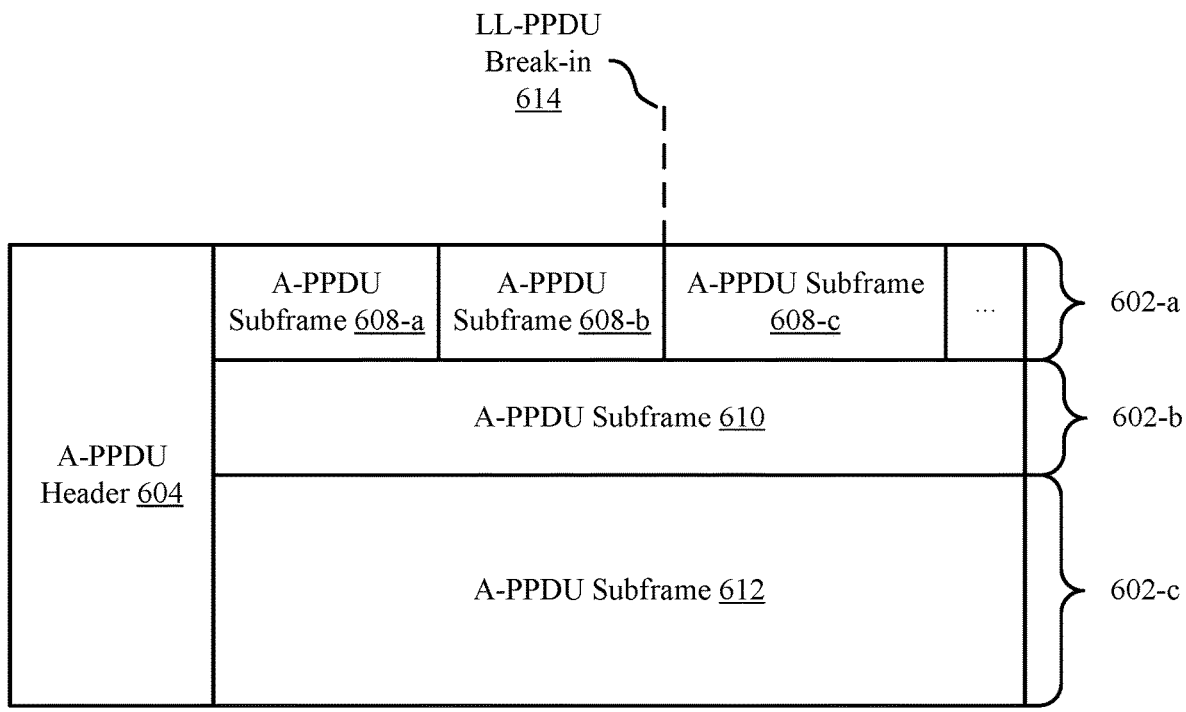
FIG. 6 shows an example of a time-domain and frequency-domain A-PPDU (TD-FD A-PPDU) usable for communications between a wireless AP and one or more wireless STAs that support PHY latency reduction.

FIG. 6 shows an example of a time-domain and frequency-domain A-PPDU (TD-FD A-PPDU) 600 usable for communications between a wireless AP and one or more wireless STAs that support PHY latency reduction. The TD-FD A-PPDU 600 may be implemented by aspects of the wireless communication network 100. For example, the TD-FD A-PPDU 600 may be communicated between wireless communication devices, such as between an AP and a STA as described with reference to FIG. 1. In some implementations, the AP and the STA may support TXOP sharing policies that enable latency-sensitive traffic to be included in a TXOP along with non-latency-sensitive traffic as discussed herein. Accordingly, the TD-FD A-PPDU 600 may have an A-PPDU format associated with low-latency traffic insertion as described herein.

The TD-FD A-PPDU 600 may be an example of an A-PPDU that is aggregated in a time domain and in a frequency domain such that two or more PPDUs are combined into a single transmission, for example, by an AP. The two or more PPDUs may be referred to as A-PPDUs or A-PPDU subframes. Thus, the TD-FD A-PPDU 600 may enable TDMA and OFDMA for communications between the AP and one or more STAs. For example, the AP and the one or more STAs may identify a TXOP for communication via a set of subchannels the wireless channel. The AP may output, and the one or more STAs may receive, the TD-FD A-PPDU 600 during the TXOP. As illustrated in FIG. 6, the AP may output the TD-FD A-PPDU 600, including an A-PPDU header 604 and a set of A-PPDUs (that is, A-PPDU subframes), via a set of subchannels 602 of a wireless channel. Each subchannel 602 may have a bandwidth that is a multiple of 20 MHZ.

The AP may output A-PPDU subframes 608 via a subchannel 602-*a*, an A-PPDU subframe 610 via a subchannel 602-*b*, and an A-PPDU subframe 612 via a subchannel 602-*c*. Each A-PPDU subframe of the TD-FD A-PPDU 600 may be addressed to a respective STA. For example, the AP may output an A-PPDU subframe 608-*a* to a first STA, an A-PPDU subframe 608-*b* to a second STA, and an A-PPDU subframe 608-*c* to a third STA. Alternatively, the AP may output one or more of the A-PPDU subframes 608 to a same STA. In some aspects, the AP may output the A-PPDU subframe 610 to a fourth STA and the A-PPDU subframe 612 to a fifth STA.

As discussed with reference to FIG. 5, the AP and the one or more STAs may support insertion of low-latency traffic into the TD-FD A-PPDU 600 in accordance with the A-PPDU format. The AP may insert LL-PPDU subframes into the TD-FD A-PPDU 600 such that OFDMA orthogonality of the subchannels 602 is maintained. For example, the AP may insert an LL-PPDU subframe via a subchannel 602 at a segment boundary (such as a symbol boundary, a PPDU boundary, or an MPDU boundary) between A-PPDU subframes of the subchannel 602, such as an LL-PPDU break-in 614 between A-PPDU subframes 608. As another example, the AP may insert the LL-PPDU subframe via a subchannel 602 such that symbol boundaries of the LL-PPDU subframe align with respective symbol boundaries of A-PPDU subframes across all subchannels 602.

Alternatively, the AP may insert the LL-PPDU subframe in accordance with a time interval indication corresponding to the LL-PPDU break-in 614, where the time interval aligns with a segment boundary of the A-PPDU subframes 608. Further, because a receiving STA may perform packet detection over 20 MHZ RUs, the LL-PPDU may be allocated a bandwidth or RU that is a multiple of 20 MHZ (that is, in accordance with the bandwidths of the subchannels 620), such that a receiving STA may be able to detect the LL-PPDU subframe.

In some aspects, the AP may select or otherwise determine one subchannel 602 of the set of subchannels 602 to use for inserting low-latency traffic, such as LL-PPDU subframes. When the AP obtains an LL-PPDU subframe from an application layer of the AP, the AP may insert the LL-PPDU subframe into the selected subchannel 602. For example, the AP may select the subchannel 602-*a* for low-latency traffic insertion. The AP may insert the LL-PPDU subframe into the subchannel 602-*a* at the LL-PPDU break-in 614, which may be an example of a periodic time interval for low-latency traffic insertion or a segment boundary. In some aspects, the LL-PPDU subframe may be addressed to a same STA as a preceding A-PPDU subframe 608 or a same STA as a subsequent A-PPDU subframe 608, while in other cases, the LL-PPDU subframe may be addressed to a different STA than the preceding A-PPDU subframe 608 or the subsequent A-PPDU subframe 608. The LL-PPDU subframe may preempt the A-PPDU subframe 608-*c*, and a STA may receive the LL-PPDU subframe via the subchannel 602-*a* as described with reference to FIG. 5. For example, the STA may terminate decoding of the A-PPDU subframe 608-*b* to receive and decode the LL-PPDU subframe at the LL-PPDU break-in 614.

The A-PPDU header 604 may include a legacy preamble, such as a legacy PHY preamble. The A-PPDU header 604 may be associated with the A-PPDU subframes 608, the A-PPDU subframe 610, and the A-PPDU subframe 612, and as such, may indicate parameters common to all of the A-PPDU subframes. Additionally, the A-PPDU header 604 may indicate RU allocation(s) for each of the A-PPDU subframes 608, the A-PPDU subframe 610, and the A-PPDU subframe 612. The A-PPDU header 604 may include a legacy STF, a legacy LTF, a legacy SIG, an RL-SIG, and a U-SIG.

In some implementations, the A-PPDU header 604 may include an indication of a PPDU type, an indication of a time interval associated with inserting low-latency traffic (such as LL-PPDU subframes), or a combination thereof. In some aspects, the A-PPDU header 604 may further indicate an insertion mode, such as whether the TD-FD A-PPDU 600 supports insertion of low-latency traffic (such as LL-PPDUs). For example, a MAC layer of the AP may determine whether insertion of low-latency traffic is supported, and the A-PPDU header 604 may indicate an insertion mode in accordance with the determination by the MAC layer. The indication of the PPDU type, the indication of the periodic time interval, and the indication of the insertion mode may, in some implementations, be included within a SIG field of the A-PPDU header 604, such as the U-SIG field. In some implementations, the A-PPDU header 604 also may indicate a length of the TD-FD A-PPDU 600, which may refer to a duration (such as a time duration) of the entire TD-FD A-PPDU 600.

Each A-PPDU subframe and each LL-PPDU subframe of the TD-FD A-PPDU 600 may have a format associated with insertion of low-latency traffic. For example, each of the A-PPDU subframes 608, the A-PPDU subframe 610, and the A-PPDU subframe 612, as well as any LL-PPDU subframes inserted into the TD-FD A-PPDU 600, may include a periodically-repeating midamble. That is, each A-PPDU subframe may include a respective midamble at a recurring location, which may correspond to a quantity of symbols (such as OFDM symbols). The midamble may include at least one symbol (such as an OFDM symbol) that includes detection and synchronization information for a respective receiving STA. For instance, when the A-PPDU subframe 608-*a* is addressed to a first STA, the midamble of the A-PPDU subframe 608-*a* may indicate synchronization information for the first STA to use to synchronize with the AP. The synchronization information may include a UHR-STF, a UHR-LTF, a UHR-SIG, or a combination thereof.

A STA receiving A-PPDU subframes of the TD-FD A-PPDU 600 via a subchannel 602 may detect an LL-PPDU subframe inserted via the subchannel 602 in accordance with a midamble. In some aspects, the STA may check a midamble to determine whether an associated A-PPDU subframe 608 is to be preempted by an LL-PPDU subframe. In the example of FIG. 6, when the subchannel 602-*a* is utilized for low-latency traffic insertion, the STA may receive the A-PPDU subframe 608-*b* and a midamble associated with the A-PPDU subframe 608-*b*. The midamble associated with the A-PPDU subframe 608-*b* may indicate that the subsequent A-PPDU subframe 608 (the A-PPDU subframe 608-*c*) is to be preempted by an LL-PPDU subframe. The STA may detect the LL-PPDU subframe at the LL-PPDU break-in 614. The STA may utilize a midamble associated with the LL-PPDU subframe to synchronize with the AP.

In some aspects, the synchronization information may be included in a midamble according to a STA to which the corresponding A-PPDU subframe is addressed. For example, if the A-PPDU subframe 608-b is addressed to a first STA and the LL-PPDU subframe is also addressed to the first STA, the midamble included in the LL-PPDU subframe may not include a UHR-SIG. That is, the midamble of the LL-PPDU subframe may not include a UHR-SIG because the UHR-SIG indicates decoding parameters for the first STA, which may have been previously indicated in the midamble of the A-PPDU subframe 608-b.

While the example of FIG. 6 illustrates A-PPDU formats for low-latency traffic insertion in downlink communications, the techniques described herein also may apply to uplink communications, and the examples described herein should not be construed as limiting. For example, in some aspects, STAs and APs may be configured to support low-latency traffic insertion in TD-FD A-PPDUs in uplink communications. A STA may obtain an LL-PPDU subframe from an application layer of the STA and may insert the LL-PPDU subframe into an uplink TD-FD A-PPDU to the AP. In some aspects, the STA may insert the LL-PPDU subframe into an RU or subchannel that was previously allocated to the STA, for example, in accordance with an UL MU group to which the STA belongs. The STA may transmit the LL-PPDU subframe in place of a PPDU previously scheduled to be transmitted via the RU or subchannel. In other cases, the STA may utilize a random access RU (RA-RU) for inserting the LL-PPDU subframe. Here, the STA may transmit the LL-PPDU subframe via the RA-RU. In this case, the LL-PPDU subframe may be transmitted from a different user than a previous non-LL user.

To support low-latency traffic insertion in TD-FD A-PPDUs in uplink communications, the AP may include an auxiliary radio. The AP may utilize the auxiliary radio for packet detection of LL-PPDU subframes. Additionally, in some aspects, the AP may utilize the auxiliary radio to determine an AGC setting on the RU or subchannel via which the LL-PPDU subframe was transmitted by the STA. Accordingly, the STA may transmit the LL-PPDU subframe according to an OFDMA assignment associated with the RU or subchannel. That is, the STA may maintain OFDMA communication parameters for the RU or subchannel when inserting LL-PPDU subframes, which may enable the AP to maintain power control via the auxiliary radio. In some implementations, the STA may include a midamble with the LL-PPDU subframe for the AP to use for synchronization at the AP.

Figure 7:
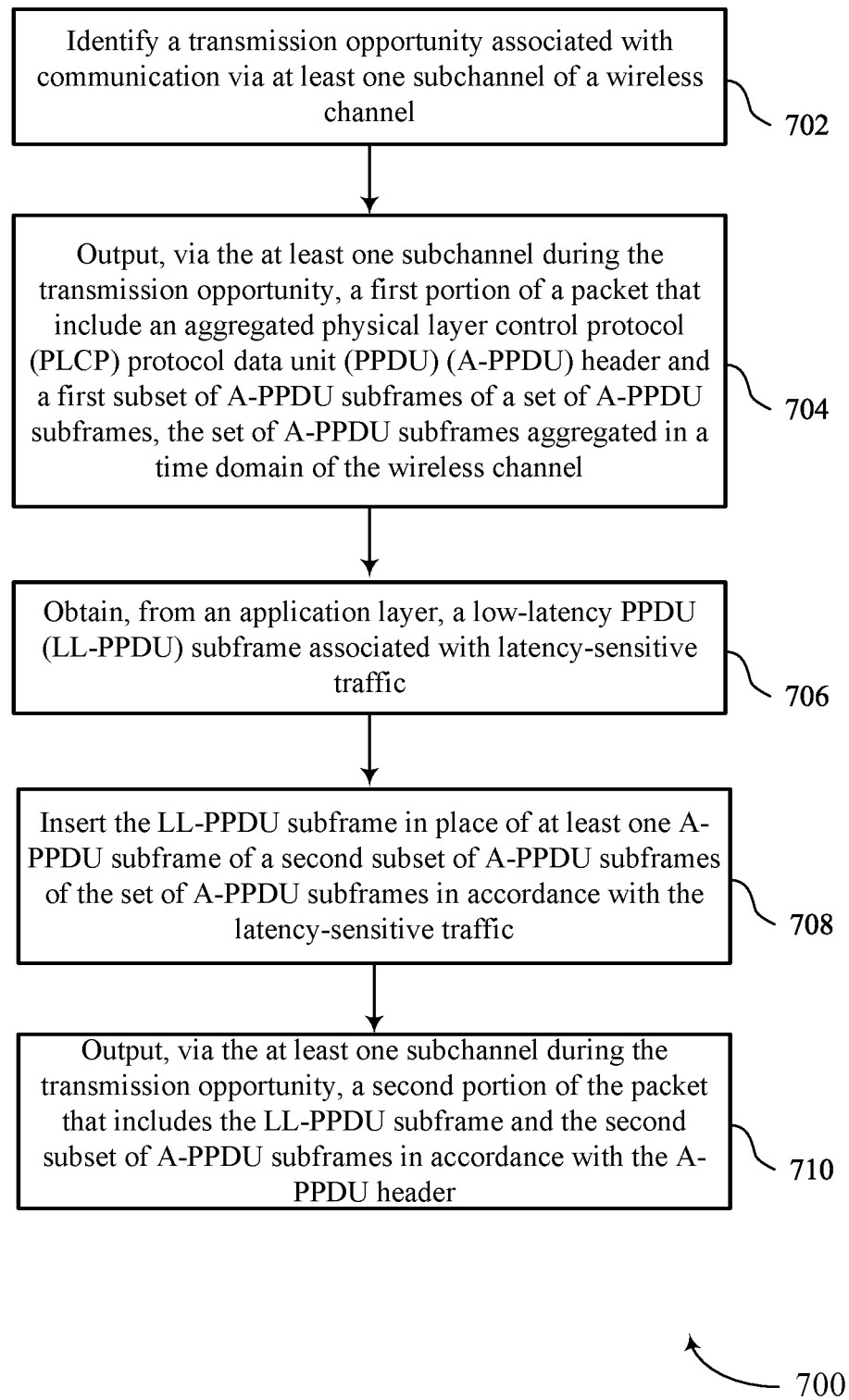
FIG. 7 shows a flowchart illustrating an example process performable at a wireless AP that supports PHY latency reduction.

FIG. 7 shows a flowchart illustrating an example process 700 performable at a wireless AP that supports PHY latency reduction. The operations of the process 700 may be implemented by a wireless AP or its components as described herein. For example, the process 700 may be performed by a wireless communication device, such as the wireless communication device 900 described with reference to FIG. 9, operating as or within a wireless AP. In some implementations, the process 700 may be performed by a wireless AP such as one of the APs 102 described with reference to FIG. 1.

In some implementations, in block 702, the wireless AP may identify a transmission opportunity associated with communication via at least one subchannel of a wireless channel.

In some implementations, in block 704, the wireless AP may output, via the at least one subchannel during the transmission opportunity, a first portion of a packet that includes an A-PPDU header and a first subset of A-PPDU subframes of a set of A-PPDU subframes, the set of A-PPDU subframes aggregated in a time domain of the wireless channel.

In some implementations, in block 706, the wireless AP may obtain, from an application layer, an LL-PPDU subframe associated with latency-sensitive traffic.

In some implementations, in block 708, the wireless AP may insert the LL-PPDU subframe in place of at least one A-PPDU subframe of a second subset of A-PPDU subframes of the set of A-PPDU subframes in accordance with the latency-sensitive traffic.

In some implementations, in block 710, the wireless AP may output, via the at least one subchannel during the transmission opportunity, a second portion of the packet that includes the LL-PPDU subframe and the second subset of A-PPDU subframes in accordance with the A-PPDU header.

Figure 8:
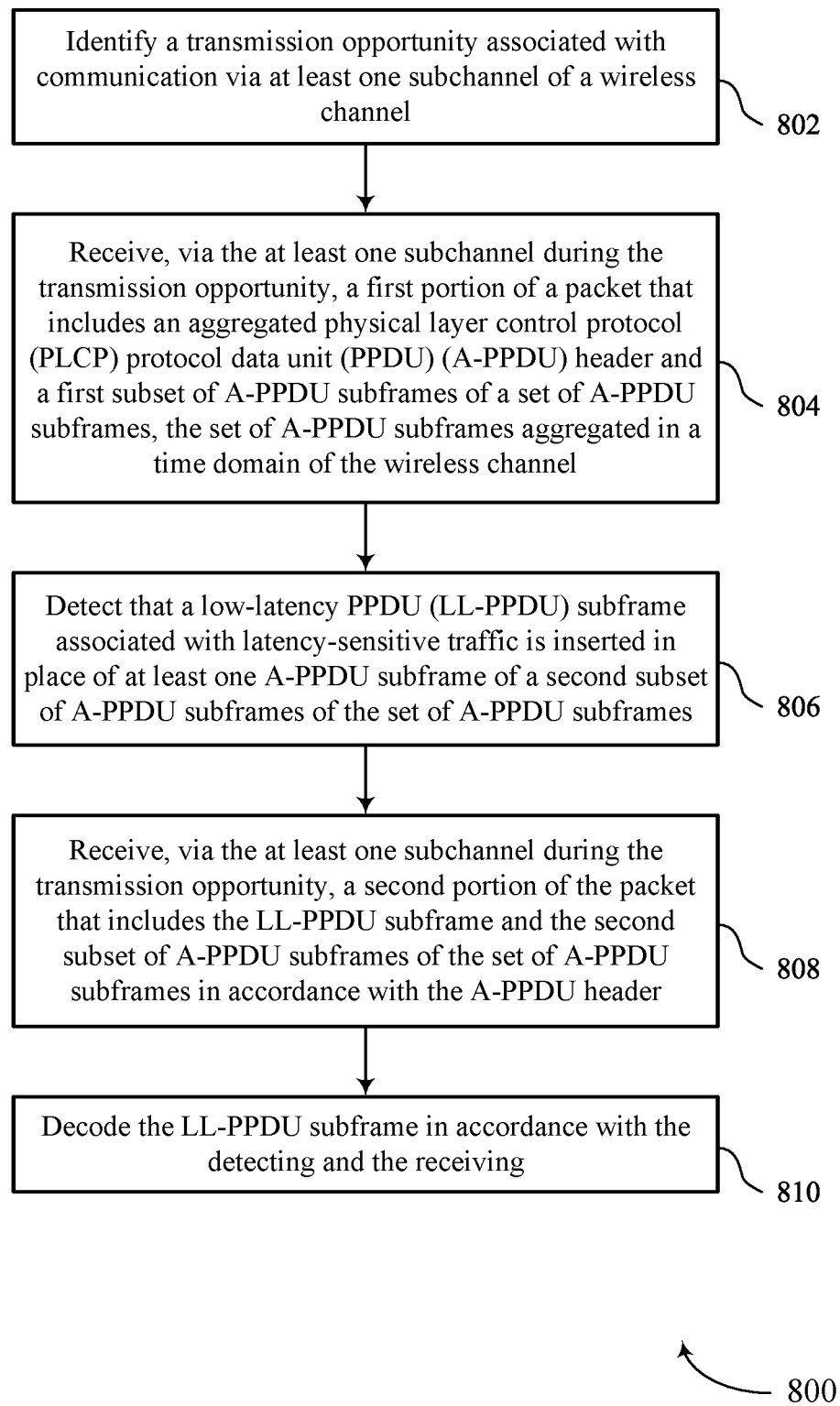
FIG. 8 shows a flowchart illustrating an example process performable at a wireless STA that supports PHY latency reduction.

FIG. 8 shows a flowchart illustrating an example process 800 performable at a wireless STA that supports PHY latency reduction. The operations of the process 800 may be implemented by a wireless STA or its components as described herein. For example, the process 800 may be performed by a wireless communication device, such as the wireless communication device 1000 described with reference to FIG. 10, operating as or within a wireless STA. In some implementations, the process 800 may be performed by a wireless STA such as one of the STAs 104 described with reference to FIG. 1.

In some implementations, in block 802, the wireless STA may identify a transmission opportunity associated with communication via at least one subchannel of a wireless channel.

In some implementations, in block 804, the wireless STA may receive, via the at least one subchannel during the transmission opportunity, a first portion of a packet that includes an A-PPDU header and a first subset of A-PPDU subframes of a set of A-PPDU subframes, the set of A-PPDU subframes aggregated in a time domain of the wireless channel.

In some implementations, in block 806, the wireless STA may detect that an LL-PPDU subframe associated with latency-sensitive traffic is inserted in place of at least one A-PPDU subframe of a second subset of A-PPDU subframes of the set of A-PPDU subframes.

In some implementations, in block 808, the wireless STA may receive, via the at least one subchannel during the transmission opportunity, a second portion of the packet that includes the LL-PPDU subframe and the second subset of A-PPDU subframes of the set of A-PPDU subframes in accordance with the A-PPDU header.

In some implementations, in block 810, the wireless STA may decode the LL-PPDU subframe in accordance with the detecting and the receiving.

Figure 9:
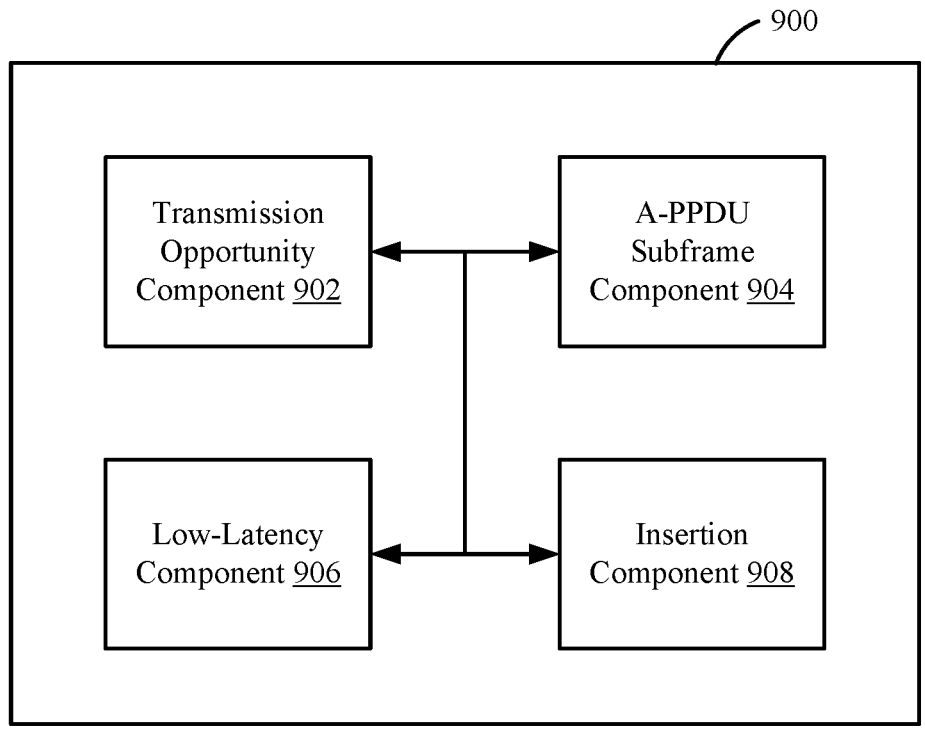
FIG. 9 shows a block diagram of an example communications manager of a wireless device, such as a wireless AP, that supports PHY latency reduction.

FIG. 9 shows a block diagram of an example wireless communication device 900 that supports PHY latency reduction. In some implementations, the wireless communication device 900 is configured or operable to perform the process 700 described with reference to FIG. 7. In various examples, the wireless communication device 900 can be a chip, SoC, chipset, package or device that may include: one or more modems (such as a Wi-Fi (IEEE 802.11) modem or a cellular modem such as 3GPP 4G LTE or 5G compliant modem); one or more processors, processing blocks or processing elements (collectively "the processor"); one or more radios (collectively "the radio"); and one or more memories or memory blocks (collectively "the memory").

In some implementations, the wireless communication device 900 can be a device for use in an AP, such as AP 102 described with reference to FIG. 1. In some other examples, the wireless communication device 900 can be an AP that includes such a chip, SoC, chipset, package or device as well as multiple antennas. The wireless communication device 900 is capable of transmitting and receiving wireless communications in the form of, for example, wireless packets. For example, the wireless communication device can be configured or operable to transmit and receive packets in the form of physical layer PPDUs and MPDUs conforming to one or more of the IEEE 802.11 family of wireless communication protocol standards. In some implementations, the wireless communication device 900 also includes or can be coupled with an application processor which may be further coupled with another memory. In some implementations, the wireless communication device 900 further includes at least one external network interface that enables communication with a core network or backhaul network to gain access to external networks including the Internet.

The wireless communication device 900 includes a transmission opportunity component 902, an A-PPDU subframe component 904, a low-latency component 906, and an insertion component 908. Portions of one or more of the components 902, 904, 906, and 908 may be implemented at least in part in hardware or firmware. For example, the A-PPDU subframe component 904 may be implemented at least in part by a modem. In some implementations, at least some of the components 902, 904, 906, and 908 are implemented at least in part by a processor and as software stored in a memory. For example, portions of one or more of the components 902, 904, 906, and 908 can be implemented as non-transitory instructions (or "code") executable by the processor to perform the functions or operations of the respective module.

In some implementations, the processor may be a component of a processing system. A processing system may generally refer to a system or series of machines or components that receives inputs and processes the inputs to produce a set of outputs (which may be passed to other systems or components of, for example, the device 900). For example, a processing system of the device 900 may refer to a system including the various other components or subcomponents of the device 900, such as the processor, or a transceiver, or a communications manager, or other components or combinations of components of the device 900. The processing system of the device 900 may interface with other components of the device 900, and may process information received from other components (such as inputs or signals) or output information to other components. For example, a chip or modem of the device 900 may include a processing system, a first interface to output information and a second interface to obtain information. In some implementations, the first interface may refer to an interface between the processing system of the chip or modem and a transmitter, such that the device 900 may transmit information output from the chip or modem. In some implementations, the second interface may refer to an interface between the processing system of the chip or modem and a receiver, such that the device 900 may obtain information or signal inputs, and the information may be passed to the processing system. A person having ordinary skill in the art will readily recognize that the first interface also may obtain information or signal inputs, and the second interface also may output information or signal outputs.

The transmission opportunity component 902 is capable of, configured to, or operable to support a means for identifying a transmission opportunity associated with communication via at least one subchannel of a wireless channel.

The A-PPDU component 904 is capable of, configured to, or operable to support a means for receiving, via the at least one subchannel during the transmission opportunity, a first portion of a packet that includes an A-PPDU header and a first subset of A-PPDU subframes of a set of A-PPDU subframes, the set of A-PPDU subframes aggregated in a time domain of the wireless channel.

The low-latency detection component 906 is capable of, configured to, or operable to support a means for detecting that an LL-PPDU subframe associated with latency-sensitive traffic is inserted in place of at least one A-PPDU subframe of a second subset of A-PPDU subframes of the set of A-PPDU subframes.

In some implementations, the A-PPDU component 904 may be configured as or otherwise support a means for receiving, via the at least one subchannel during the transmission opportunity, a second portion of the packet that includes the LL-PPDU subframe and the second subset of A-PPDU subframes of the set of A-PPDU subframes in accordance with the A-PPDU header.

The decoding component 908 is capable of, configured to, or operable to support a means for decoding the LL-PPDU subframe in accordance with the detecting and the receiving.

In some implementations, the decoding component 908 may be configured as or otherwise support a means for terminating decoding of a final A-PPDU subframe of the first subset of A-PPDU subframes to decode the LL-PPDU subframe.

In some implementations, the A-PPDU header includes a PHY preamble, an indication of a PPDU type, an indication of a periodic time interval for inserting LL-PPDU subframes, and an indication of a length of the packet.

In some implementations, the low-latency detection component 906 may be configured as or otherwise support a means for enabling packet detection at each time interval boundary in accordance with the indication of the periodic time interval, the LL-PPDU subframe detected in accordance with the packet detection.

In some implementations, to support detecting that the LL-PPDU subframe is inserted in place of the at least one A-PPDU subframe, the low-latency detection component 906 may be configured as or otherwise support a means for detecting a break indication symbol appended to a final A-PPDU subframe of the first subset of A-PPDU subframes, the break indication symbol indicating that the LL-PPDU subframe is inserted in place of the at least one A-PPDU subframe. In some implementations, to support detecting that the LL-PPDU subframe is inserted in place of the at least one A-PPDU subframe, the decoding component 908 may be configured as or otherwise support a means for terminating decoding of the final A-PPDU subframe of the first subset of A-PPDU subframes to receive the LL-PPDU subframe.

In some implementations, a first A-PPDU subframe of the first subset of A-PPDU subframes includes at least one UHR-LTF, an UHR-SIG, and a data payload. In some implementations, the LL-PPDU subframe and each A-PPDU subframe subsequent to the first A-PPDU subframe in the set of A-PPDU subframes includes a respective UHR-STF, a respective UHR-LTF, and a respective UHR-SIG, where the LL-PPDU subframe is detected in accordance with the respective UHR-STF.

In some implementations, the LL-PPDU subframe and each A-PPDU subframe subsequent to the first A-PPDU subframe in the set of A-PPDU subframes includes a midamble, the midamble including at least one OFDM symbol that includes synchronization information for the STA. In some implementations, the LL-PPDU subframe is decoded in accordance with the synchronization information.

In some implementations, the at least one subchannel belongs to a set of subchannels of the wireless channel such that the set of A-PPDU subframes is further aggregated in the frequency domain, the at least one subchannel being associated with the latency-sensitive traffic. In some implementations, the A-PPDU header allocates OFDMA RUs for the set of A-PPDU subframes.

In some implementations, the LL-PPDU subframe is inserted such that a symbol boundary of the LL-PPDU subframe is aligned with respective symbol boundaries of the third subset of A-PPDU subframes of the second subchannel and the fourth subset of A-PPDU subframes of the third subchannel.

In some implementations, the LL-PPDU subframe and each A-PPDU subframe in the set of A-PPDU subframes includes a midamble, the midamble including at least one OFDM symbol that includes synchronization information for the STA. In some implementations, the LL-PPDU subframe is detected in accordance with the midamble.

In some implementations, the synchronization information includes at least one of a UHR-STF, a UHR-LTF, and a UHR-SIG.

Figure 10:
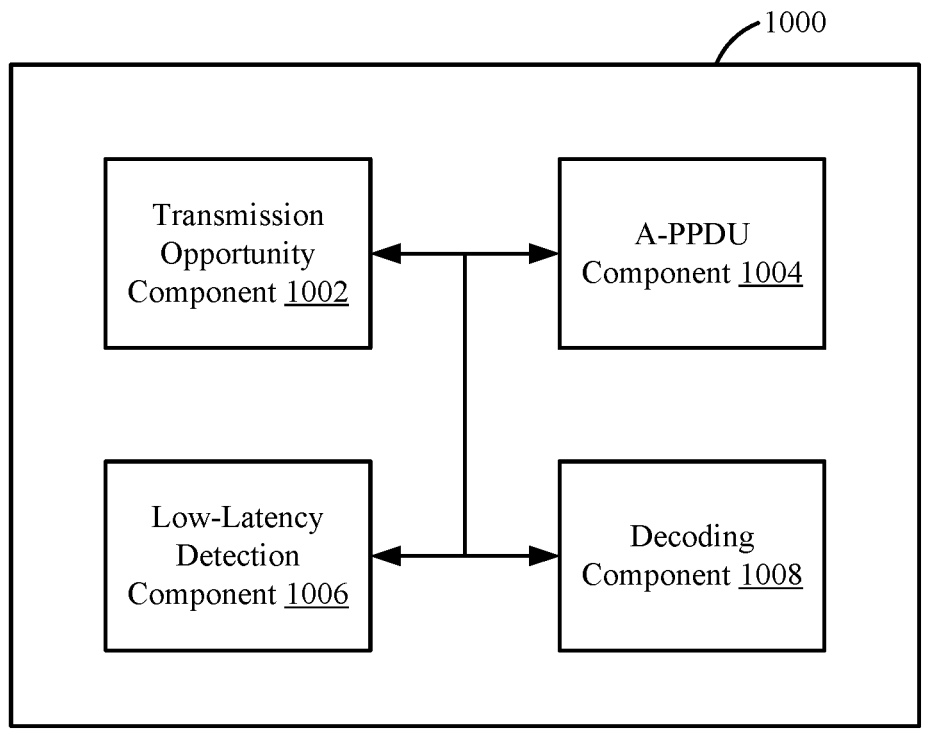
FIG. 10 shows a block diagram of an example communications manager of a wireless device, such as a wireless STA, that supports PHY latency reduction.

FIG. 10 shows a block diagram of an example wireless communication device 1000 that supports PHY latency reduction according to some aspects of the present disclosure. In some implementations, the wireless communication device 1000 is configured or operable to perform the process 800 described with reference to FIG. 8. In various examples, the wireless communication device 1000 can be a chip, SoC, chipset, package or device that may include: one or more modems (such as, a Wi-Fi (IEEE 802.11) modem or a cellular modem such as 3GPP 4G LTE or 5G compliant modem), one or more processors, processing blocks or processing elements (collectively "the processor"); one or more radios (collectively "the radio"); and one or more memories or memory blocks (collectively "the memory").

In some implementations, the wireless communication device 1000 can be a device for use in a STA, such as STA 104 described with reference to FIG. 1. In some other examples, the wireless communication device 1000 can be a STA that includes such a chip, SoC, chipset, package or device as well as multiple antennas. The wireless communication device 1000 is capable of transmitting and receiving wireless communications in the form of, for example, wireless packets. For example, the wireless communication device can be configured or operable to transmit and receive packets in the form of physical layer PPDUs and MPDUs conforming to one or more of the IEEE 802.11 family of wireless communication protocol standards. In some implementations, the wireless communication device 1000 also includes or can be coupled with an application processor which may be further coupled with another memory. In some implementations, the wireless communication device 1000 further includes a user interface (UI) (such as a touchscreen or keypad) and a display, which may be integrated with the UI to form a touchscreen display. In some implementations, the wireless communication device 1000 may further include one or more sensors such as, for example, one or more inertial sensors, accelerometers, temperature sensors, pressure sensors, or altitude sensors.

The wireless communication device 1000 includes a transmission opportunity component 1002, an A-PPDU subframe component 1004, a low-latency component 1006, an insertion component 1008, or any combination thereof. Portions of one or more of the components 1002, 1004, 1006, and 1008 may be implemented at least in part in hardware or firmware. For example, the -PPDU subframe component 1004 may be implemented at least in part by a modem. In some implementations, at least some of the components 1002, 1004, 1006, and 1008 are implemented at least in part by a processor and as software stored in a memory. For example, portions of one or more of the components 1002, 1004, 1006, and 1008 can be implemented as non-transitory instructions (or "code") executable by the processor to perform the functions or operations of the respective module.

In some implementations, the processor may be a component of a processing system. A processing system may generally refer to a system or series of machines or components that receives inputs and processes the inputs to produce a set of outputs (which may be passed to other systems or components of, for example, the device 1000). For example, a processing system of the device 1000 may refer to a system including the various other components or subcomponents of the device 1000, such as the processor, or a transceiver, or a communications manager, or other components or combinations of components of the device 1000. The processing system of the device 1000 may interface with other components of the device 1000, and may process information received from other components (such as inputs or signals) or output information to other components. For example, a chip or modem of the device 1000 may include a processing system, a first interface to output information and a second interface to obtain information. In some implementations, the first interface may refer to an interface between the processing system of the chip or modem and a transmitter, such that the device 1000 may transmit information output from the chip or modem. In some implementations, the second interface may refer to an interface between the processing system of the chip or modem and a receiver, such that the device 1000 may obtain information or signal inputs, and the information may be passed to the processing system. A person having ordinary skill in the art will readily recognize that the first interface also may obtain information or signal inputs, and the second interface also may output information or signal outputs.

The transmission opportunity component 1002 is capable of, configured to, or operable to a means for identifying a TXOP associated with communication via at least one subchannel of a wireless channel.

The A-PPDU subframe component 1004 is capable of, configured to, or operable to support a means for outputting, via the at least one subchannel during the transmission opportunity, a first portion of a packet that includes an A-PPDU header and a first subset of A-PPDU subframes of a set of A-PPDU subframes, the set of A-PPDU subframes aggregated in a time domain of the wireless channel.

The low-latency component 1006 is capable of, configured to, or operable to support a means for obtaining, from an application layer, an LL-PPDU subframe associated with latency-sensitive traffic.

The insertion component 1008 is capable of, configured to, or operable to support a means for inserting the LL-PPDU subframe in place of at least one A-PPDU subframe of a second subset of A-PPDU subframes of the set of A-PPDU subframes in accordance with the latency-sensitive traffic.

In some implementations, the A-PPDU subframe component 1004 may be configured as or otherwise support a means for outputting, via the at least one subchannel during the TXOP, a second portion of the packet that includes the LL-PPDU subframe and the second subset of A-PPDU subframes in accordance with the A-PPDU header.

In some implementations, the A-PPDU header includes a PHY preamble and an indication of at least one of a PPDU type, a periodic time interval for inserting LL-PPDU subframes, and a length of the packet.

In some implementations, the LL-PPDU subframe is inserted in place of the at least one A-PPDU subframe in accordance with a periodic time interval indication for inserting LL-PPDU subframes.

In some implementations, the insertion component 008 may be configured as or otherwise support a means for appending a break indication symbol to each A-PPDU subframe in the set of A-PPDU subframes, the break indication symbol indicating whether a subsequent A-PPDU subframe is to be preempted by a respective LL-PPDU subframe, the LL-PPDU subframe inserted in place of the at least one A-PPDU subframe in accordance with the break indication symbol.

In some implementations, a first A-PPDU subframe of the first subset of A-PPDU subframes includes at least one UHR-LTF, a UHR-SIG, and a data payload. In some implementations, the LL-PPDU subframe and each A-PPDU subframe subsequent to the first A-PPDU subframe in the set of A-PPDU subframes includes a UHR-STF associated with a respective receiving STA, a UHR-LTF, and a UHR-SIG.

In some implementations, the LL-PPDU subframe and each A-PPDU subframe subsequent to the first A-PPDU subframe in the set of A-PPDU subframes includes a midamble, the midamble including at least one OFDM symbol that includes synchronization information for the respective receiving STA.

In some implementations, the at least one subchannel belongs to a set of subchannels of the wireless channel such that the set of A-PPDU subframes is further aggregated in the frequency domain, and the A-PPDU subframe component 1004 may be configured as or otherwise support a means for outputting, via a second subchannel of the set of subchannels during the transmission opportunity, a third subset of A-PPDU subframes of the set of A-PPDU subframes in accordance with the A-PPDU header. In some implementations, the at least one subchannel belongs to a set of subchannels of the wireless channel such that the set of A-PPDU subframes is further aggregated in the frequency domain, and the A-PPDU subframe component 1004 may be configured as or otherwise support a means for outputting, via a third subchannel of the set of subchannels during the transmission opportunity, a fourth subset of A-PPDU subframes of the set of A-PPDU subframes in accordance with the A-PPDU header.

In some implementations, the low-latency component 1006 may be configured as or otherwise support a means for selecting, from the set of subchannels of the wireless channel, the at least one subchannel to be used for the latency-sensitive traffic.

In some implementations, the A-PPDU header is output via the set of subchannels of the wireless channel. In some implementations, the A-PPDU header allocates OFDMA RUs for the set of A-PPDU subframes.

In some implementations, the LL-PPDU subframe is inserted such that a symbol boundary of the LL-PPDU subframe is aligned with respective symbol boundaries of the third subset of A-PPDU subframes of the second subchannel and the fourth subset of A-PPDU subframes of the third subchannel.

In some implementations, the LL-PPDU subframe and each A-PPDU subframe in the set of A-PPDU subframes includes a midamble, the midamble including at least one OFDM symbol that includes synchronization information for a respective receiving STA.

In some implementations, the synchronization information includes at least one of a UHR-STF, a UHR-LTF, and a UHR-SIG.

The following provides an overview of aspects of the present disclosure:

Aspect 1: A method for wireless communications at an AP, including: identifying a transmission opportunity associated with communication via at least one subchannel of a wireless channel; outputting, via the at least one subchannel during the transmission opportunity, a first portion of a packet that includes an A-PPDU) header and a first subset of A-PPDU subframes of a set of A-PPDU subframes, the set of A-PPDU subframes aggregated in a time domain of the wireless channel; obtaining, from an application layer, an LL-PPDU subframe associated with latency-sensitive traffic; inserting the LL-PPDU subframe in place of at least one A-PPDU subframe of a second subset of A-PPDU subframes of the set of A-PPDU subframes in accordance with the latency-sensitive traffic; and outputting, via the at least one subchannel during the transmission opportunity, a second portion of the packet that includes the LL-PPDU subframe and the second subset of A-PPDU subframes in accordance with the A-PPDU header.

Aspect 2: The method of aspect 1, where the A-PPDU header includes a PHY preamble and an indication of at least one of a PPDU type, a periodic time interval for inserting LL-PPDU subframes, and a length of the packet.

Aspect 3: The method of any of aspects 1 through 2, where the LL-PPDU subframe is inserted in place of the at least one A-PPDU subframe in accordance with a periodic time interval indication for inserting LL-PPDU subframes.

Aspect 4: The method of any of aspects 1 through 2, further including: appending a break indication symbol to each A-PPDU subframe in the set of A-PPDU subframes, the break indication symbol indicating whether a subsequent A-PPDU subframe is to be preempted by a respective LL-PPDU subframe, the LL-PPDU subframe inserted in place of the at least one A-PPDU subframe in accordance with the break indication symbol.

Aspect 5: The method of any of aspects 1 through 4, where a first A-PPDU subframe of the first subset of A-PPDU subframes includes at least one UHR-LTF, a UHR-SIG, and a data payload; and the LL-PPDU subframe and each A-PPDU subframe subsequent to the first A-PPDU subframe in the set of A-PPDU subframes includes a UHR-STF associated with a respective receiving STA, a UHR-LTF, and a UHR-SIG.

Aspect 6: The method of aspect 5, where the LL-PPDU subframe and each A-PPDU subframe subsequent to the first A-PPDU subframe in the set of A-PPDU subframes includes a midamble, the midamble including at least one OFDM symbol that includes synchronization information for the respective receiving STA.

Aspect 7: The method of any of aspects 1 through 4, where the at least one subchannel belongs to a set of subchannels of the wireless channel such that the set of A-PPDU subframes is further aggregated in a frequency domain, the method further including: outputting, via a second subchannel of the set of subchannels during the transmission opportunity, a third subset of A-PPDU subframes of the set of A-PPDU subframes in accordance with the A-PPDU header; and outputting, via a third subchannel of the set of subchannels during the transmission opportunity, a fourth subset of A-PPDU subframes of the set of A-PPDU subframes in accordance with the A-PPDU header.

Aspect 8: The method of aspect 7, further including: selecting, from the set of subchannels of the wireless channel, the at least one subchannel to be used for the latency-sensitive traffic.

Aspect 9: The method of any of aspects 7 through 8, where the A-PPDU header is output via the set of subchannels of the wireless channel; and the A-PPDU header allocates OFDMA RUs for the set of A-PPDU subframes.

Aspect 10: The method of any of aspects 7 through 9, where the LL-PPDU subframe is inserted such that a symbol boundary of the LL-PPDU subframe is aligned with respective symbol boundaries of the third subset of A-PPDU subframes of the second subchannel and the fourth subset of A-PPDU subframes of the third subchannel.

Aspect 11: The method of any of aspects 7 through 10, where the LL-PPDU subframe and each A-PPDU subframe in the set of A-PPDU subframes includes a midamble, the midamble including at least one OFDM symbol that includes synchronization information for a respective receiving STA.

Aspect 12: The method of aspect 11, where the synchronization information includes at least one of a UHR-STF, a UHR-LTF, and a UHR-SIG.

Aspect 13: A method for wireless communications at a STA, including: identifying a transmission opportunity associated with communication via at least one subchannel of a wireless channel; receiving, via the at least one subchannel during the transmission opportunity, a first portion of a packet that includes an A-PPDU header and a first subset of A-PPDU subframes of a set of A-PPDU subframes, the set of A-PPDU subframes aggregated in a time domain of the wireless channel; detecting that an LL-PPDU subframe associated with latency-sensitive traffic is inserted in place of at least one A-PPDU subframe of a second subset of A-PPDU subframes of the set of A-PPDU subframes; receiving, via the at least one subchannel during the transmission opportunity, a second portion of the packet that includes the LL-PPDU subframe and the second subset of A-PPDU subframes of the set of A-PPDU subframes in accordance with the A-PPDU header; and decoding the LL-PPDU subframe in accordance with the detecting and the receiving.

Aspect 14: The method of aspect 13, further including: terminating decoding of a final A-PPDU subframe of the first subset of A-PPDU subframes to decode the LL-PPDU subframe.

Aspect 15: The method of any of aspects 13 through 14, where the A-PPDU header includes a PHY preamble, an indication of a PPDU type, an indication of a periodic time interval for inserting LL-PPDU subframes, and an indication of a length of the packet.

Aspect 16: The method of aspect 15, further including: enabling packet detection at each time interval boundary in accordance with the indication of the periodic time interval, the LL-PPDU subframe detected in accordance with the packet detection.

Aspect 17: The method of any of aspects 13 through 16, where detecting that the LL-PPDU subframe is inserted in place of the at least one A-PPDU subframe includes: detecting a break indication symbol appended to a final A-PPDU subframe of the first subset of A-PPDU subframes, the break indication symbol indicating that the LL-PPDU subframe is inserted in place of the at least one A-PPDU subframe; and terminating decoding of the final A-PPDU subframe of the first subset of A-PPDU subframes to receive the LL-PPDU subframe.

Aspect 18: The method of any of aspects 13 through 17, where a first A-PPDU subframe of the first subset of A-PPDU subframes includes at least one UHR-LTF, a UHR-SIG, and a data payload; and the LL-PPDU subframe and each A-PPDU subframe subsequent to the first A-PPDU subframe in the set of A-PPDU subframes includes a respective UHR-STF, a respective UHR-LTF, and a respective UHR-SIG, the LL-PPDU subframe detected in accordance with the respective UHR-STF.

Aspect 19: The method of aspect 18, where the LL-PPDU subframe and each A-PPDU subframe subsequent to the first A-PPDU subframe in the set of A-PPDU subframes includes a midamble, the midamble including at least one OFDM symbol that includes synchronization information for the STA; and the LL-PPDU subframe is decoded in accordance with the synchronization information.

Aspect 20: The method of any of aspects 13 through 17, where the at least one subchannel belongs to a set of subchannels of the wireless channel such that the set of A-PPDU subframes is further aggregated in a frequency domain, the at least one subchannel being associated with the latency-sensitive traffic; and the A-PPDU header allocates OFDMA RUs for the set of A-PPDU subframes.

Aspect 21: The method of aspect 20, where the LL-PPDU subframe is inserted such that a symbol boundary of the LL-PPDU subframe is aligned with respective symbol boundaries of the third subset of A-PPDU subframes of the second subchannel and the fourth subset of A-PPDU subframes of the third subchannel.

Aspect 22: The method of any of aspects 20 through 21, where the LL-PPDU subframe and each A-PPDU subframe in the set of A-PPDU subframes includes a midamble, the midamble including at least one OFDM symbol that includes synchronization information for the STA; and the LL-PPDU subframe is detected in accordance with the midamble.

Aspect 23: The method of aspect 22, where the synchronization information includes at least one of a UHR-STF, a UHR-LTF, and a UHR-SIG.

Aspect 24: An apparatus for wireless communications at an AP, including at least one processor and memory coupled with the at least one processor; the at least one processor and memory operable to cause the AP to perform a method of any of aspects 1 through 12.

Aspect 25: An apparatus for wireless communications at an AP, including at least one means for performing a method of any of aspects 1 through 12.

Aspect 26: A non-transitory computer-readable medium storing code for wireless communications at an AP, the code including instructions executable by a processor to perform a method of any of aspects 1 through 12.

Aspect 27: An apparatus for wireless communications at a STA, including at least one processor and memory coupled with the at least one processor; the at least one processor and memory operable to cause the STA to perform a method of any of aspects 13 through 23.

Aspect 28: An apparatus for wireless communications at a STA, including at least one means for performing a method of any of aspects 13 through 23.

Aspect 29: A non-transitory computer-readable medium storing code for wireless communications at an STA, the code including instructions executable by a processor to perform a method of any of aspects 13 through 23.

As used herein, the term "determine" or "determining" encompasses a wide variety of actions and, therefore, "determining" can include calculating, computing, processing, deriving, investigating, looking up (such as via looking up in a table, a database or another data structure), inferring, ascertaining, measuring, and the like. Also, "determining" can include receiving (such as receiving information), accessing (such as accessing data stored in memory), transmitting (such as transmitting information) and the like. Also, "determining" can include resolving, selecting, obtaining, choosing, establishing and other such similar actions.

As used herein, a phrase referring to "at least one of" a list of items refers to any combination of those items, including single members. As an example, "at least one of: a, b, or c" is intended to cover: a, b, c, a-b, a-c, b-c, and a-b-c. As used herein, "or" is intended to be interpreted in the inclusive sense, unless otherwise explicitly indicated. For example, "a or b" may include a only, b only, or a combination of a and b.

As used herein, "based on" is intended to be interpreted in the inclusive sense, unless otherwise explicitly indicated. For example, "based on" may be used interchangeably with "based at least in part on," "associated with", or "in accordance with" unless otherwise explicitly indicated. Specifically, unless a phrase refers to "based on only 'a,'" or the equivalent in context, whatever it is that is "based on 'a,'" or "based at least in part on 'a,'" may be based on "a" alone or based on a combination of "a" and one or more other factors, conditions or information.

The various illustrative components, logic, logical blocks, modules, circuits, operations and algorithm processes described in connection with the examples disclosed herein may be implemented as electronic hardware, firmware, software, or combinations of hardware, firmware or software, including the structures disclosed in this specification and the structural equivalents thereof. The interchangeability of hardware, firmware and software has been described generally, in terms of functionality, and illustrated in the various illustrative components, blocks, modules, circuits and processes described above. Whether such functionality is implemented in hardware, firmware or software depends upon the particular application and design constraints imposed on the overall system.

Various modifications to the examples described in this disclosure may be readily apparent to persons having ordinary skill in the art, and the generic principles defined herein may be applied to other examples without departing from the spirit or scope of this disclosure. Thus, the claims are not intended to be limited to the examples shown herein, but are to be accorded the widest scope consistent with this disclosure, the principles and the novel features disclosed herein.

Additionally, various features that are described in this specification in the context of separate examples also can be implemented in combination in a single implementation. Conversely, various features that are described in the context of a single implementation also can be implemented in multiple examples separately or in any suitable subcombination. As such, although features may be described above as acting in particular combinations, and even initially claimed as such, one or more features from a claimed combination can in some aspects be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one or more example processes in the form of a flowchart or flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the examples described above should not be understood as requiring such separation in all examples, and it should be understood that the described program components and systems can generally be integrated together in a single software product or packaged into multiple software products.

What is claimed is:

1. An apparatus for wireless communication at an access point (AP), comprising:
a processor; and
memory coupled to the processor, the processor and memory operable to cause the apparatus to:
identify a transmission opportunity associated with communication via at least one subchannel of a wireless channel;
outputting, via the at least one subchannel during the transmission opportunity, a first portion of a packet that includes an aggregated physical layer control protocol (PLCP) protocol data unit (PPDU) (A-PPDU) header and a first subset of A-PPDU subframes of a set of A-PPDU subframes, the set of A-PPDU subframes aggregated in a time domain of the wireless channel;
obtain, from an application layer, a low-latency PPDU (LL-PPDU) subframe associated with latency-sensitive traffic;
insert the LL-PPDU subframe in place of at least one A-PPDU subframe of a second subset of A-PPDU subframes of the set of A-PPDU subframes in accordance with the latency-sensitive traffic; and
outputting, via the at least one subchannel during the transmission opportunity, a second portion of the packet that includes the LL-PPDU subframe and the second subset of A-PPDU subframes in accordance with the A-PPDU header.

2. The apparatus of claim 1, wherein the A-PPDU header comprises a physical layer (PHY) preamble and an indication of at least one of a PPDU type, a periodic time interval for inserting LL-PPDU subframes, and a length of the packet.

3. The apparatus of claim 1, wherein the LL-PPDU subframe is inserted in place of the at least one A-PPDU subframe in accordance with a periodic time interval indication for inserting LL-PPDU subframes.

4. The apparatus of claim 1, wherein the processor and memory are further operable to cause the apparatus to:
append a break indication symbol to each A-PPDU subframe in the set of A-PPDU subframes, the break indication symbol indicating whether a subsequent A-PPDU subframe is to be preempted by a respective LL-PPDU subframe, the LL-PPDU subframe inserted in place of the at least one A-PPDU subframe in accordance with the break indication symbol.

5. The apparatus of claim 1, wherein:
a first A-PPDU subframe of the first subset of A-PPDU subframes includes at least one ultra-high-reliability long training field (UHR-LTF), an ultra-high-reliability signal field (UHR-SIG), and a data payload; and
the LL-PPDU subframe and each A-PPDU subframe subsequent to the first A-PPDU subframe in the set of A-PPDU subframes includes an ultra-high-reliability short training field (UHR-STF) associated with a respective receiving station (STA), a UHR-LTF, and a UHR-SIG.

6. The apparatus of claim 5, wherein the LL-PPDU subframe and each A-PPDU subframe subsequent to the first A-PPDU subframe in the set of A-PPDU subframes includes a midamble, the midamble comprising at least one orthogonal frequency division multiplexing (OFDM) symbol that includes synchronization information for the respective receiving station (STA).

7. The apparatus of claim 1, wherein the at least one subchannel belongs to a set of subchannels of the wireless channel such that the set of A-PPDU subframes is further aggregated in a frequency domain, and the processor and memory are further operable to cause the apparatus to:
output, via a second subchannel of the set of subchannels during the transmission opportunity, a third subset of A-PPDU subframes of the set of A-PPDU subframes in accordance with the A-PPDU header; and
output, via a third subchannel of the set of subchannels during the transmission opportunity, a fourth subset of A-PPDU subframes of the set of A-PPDU subframes in accordance with the A-PPDU header.

8. The apparatus of claim 7, wherein the processor and memory are further operable to cause the apparatus to:
select, from the set of subchannels of the wireless channel, the at least one subchannel to be used for the latency-sensitive traffic.

9. The apparatus of claim 7, wherein:
the A-PPDU header is output via the set of subchannels of the wireless channel; and
the A-PPDU header allocates orthogonal frequency division multiple access (OFDMA) resource units (RUs) for the set of A-PPDU subframes.

10. The apparatus of claim 7, wherein the LL-PPDU subframe is inserted such that a symbol boundary of the LL-PPDU subframe is aligned with respective symbol boundaries of the third subset of A-PPDU subframes of the second subchannel and the fourth subset of A-PPDU subframes of the third subchannel.

11. The apparatus of claim 7, wherein the LL-PPDU subframe and each A-PPDU subframe in the set of A-PPDU subframes includes a midamble, the midamble comprising at least one orthogonal frequency division multiplexing (OFDM) symbol that includes synchronization information for a respective receiving station (STA).

12. The apparatus of claim 11, wherein the synchronization information includes at least one of an ultra-high-reliability short training field (UHR-STF), an ultra-high-reliability long training field (UHR-LTF), and an ultra-high-reliability signal field (UHR-SIG).

13. An apparatus for wireless communications at a station (STA), comprising:
a processor; and
memory coupled to the processor, the processor and memory operable to cause the apparatus to:
identify a transmission opportunity associated with communication via at least one subchannel of a wireless channel;
receive, via the at least one subchannel during the transmission opportunity, a first portion of a packet that includes an aggregated physical layer control protocol (PLCP) protocol data unit (PPDU) (A-PPDU) header and a first subset of A-PPDU subframes of a set of A-PPDU subframes, the set of A-PPDU subframes aggregated in a time domain of the wireless channel;
detect that a low-latency PPDU (LL-PPDU) subframe associated with latency-sensitive traffic is inserted in place of at least one A-PPDU subframe of a second subset of A-PPDU subframes of the set of A-PPDU subframes;
receive, via the at least one subchannel during the transmission opportunity, a second portion of the packet that includes the LL-PPDU subframe and the second subset of A-PPDU subframes of the set of A-PPDU subframes in accordance with the A-PPDU header; and
decode the LL-PPDU subframe in accordance with the detecting and the receiving.

14. The apparatus of claim 13, wherein the processor and memory are further operable to cause the apparatus to:
terminate decoding of a final A-PPDU subframe of the first subset of A-PPDU subframes to decode the LL-PPDU subframe.

15. The apparatus of claim 13, wherein the A-PPDU header comprises a physical layer (PHY) preamble, an indication of a PPDU type, an indication of a periodic time interval for inserting LL-PPDU subframes, and an indication of a length of the packet.

16. The apparatus of claim 15, wherein the processor and memory are further operable to cause the apparatus to:
enable packet detection at each time interval boundary in accordance with the indication of the periodic time interval, the LL-PPDU subframe detected in accordance with the packet detection.

17. The apparatus of claim 13, wherein the processor and memory are further operable to:
detect a break indication symbol appended to a final A-PPDU subframe of the first subset of A-PPDU subframes, the break indication symbol indicating that the LL-PPDU subframe is inserted in place of the at least one A-PPDU subframe; and
terminate decoding of the final A-PPDU subframe of the first subset of A-PPDU subframes to receive the LL-PPDU subframe.

18. The apparatus of claim 13, wherein:
a first A-PPDU subframe of the first subset of A-PPDU subframes includes at least one ultra-high-reliability long training field (UHR-LTF), an ultra-high-reliability signal field (UHR-SIG), and a data payload; and
the LL-PPDU subframe and each A-PPDU subframe subsequent to the first A-PPDU subframe in the set of A-PPDU subframes includes a respective ultra-high-reliability short training field (UHR-STF), a respective UHR-LTF, and a respective UHR-SIG, the LL-PPDU subframe detected in accordance with the respective UHR-STF.

19. The apparatus of claim 18, wherein:
the LL-PPDU subframe and each A-PPDU subframe subsequent to the first A-PPDU subframe in the set of A-PPDU subframes includes a midamble, the midamble comprising at least one orthogonal frequency division multiplexing (OFDM) symbol that includes synchronization information for the STA; and the LL-PPDU subframe is decoded in accordance with the synchronization information.

20. The apparatus of claim 13, wherein:
the at least one subchannel belongs to a set of subchannels of the wireless channel such that the set of A-PPDU subframes is further aggregated in a frequency domain, the at least one subchannel being associated with the latency-sensitive traffic; and
the A-PPDU header allocates orthogonal frequency division multiple access (OFDMA) resource units (RUs) for the set of A-PPDU subframes.

21. The apparatus of claim 20, wherein the LL-PPDU subframe is inserted such that a symbol boundary of the LL-PPDU subframe is aligned with respective symbol boundaries of a third subset of A-PPDU subframes of a second subchannel of the set of subchannels and a fourth subset of A-PPDU subframes of a third subchannel of the set of subchannels.

22. The apparatus of claim 20, wherein:
the LL-PPDU subframe and each A-PPDU subframe in the set of A-PPDU subframes includes a midamble, the midamble comprising at least one orthogonal frequency division multiplexing (OFDM) symbol that includes synchronization information for the STA; and
the LL-PPDU subframe is detected in accordance with the midamble.

23. The apparatus of claim 22, wherein the synchronization information includes at least one of ultra-high-reliability short training field (UHR-STF), an ultra-high-reliability long training field (UHR-LTF), and an ultra-high-reliability signal field (UHR-SIG).

24. A method for wireless communications at an access point (AP), comprising:
identifying a transmission opportunity associated with communication via at least one subchannel of a wireless channel;
outputting, via the at least one subchannel during the transmission opportunity, a first portion of a packet that includes an aggregated physical layer control protocol (PLCP) protocol data unit (PPDU) (A-PPDU) header and a first subset of A-PPDU subframes of a set of A-PPDU subframes, the set of A-PPDU subframes aggregated in a time domain of the wireless channel;
obtaining, from an application layer, a low-latency PPDU (LL-PPDU) subframe associated with latency-sensitive traffic;
inserting the LL-PPDU subframe in place of at least one A-PPDU subframe of a second subset of A-PPDU subframes of the set of A-PPDU subframes in accordance with the latency-sensitive traffic; and
outputting, via the at least one subchannel during the transmission opportunity, a second portion of the packet that includes the LL-PPDU subframe and the second subset of A-PPDU subframes in accordance with the A-PPDU header.

25. The method of claim 24, wherein the A-PPDU header comprises a physical layer (PHY) preamble and an indication of at least one of a PPDU type, a periodic time interval for inserting LL-PPDU subframes, and a length of the packet.

26. The method of claim 24, wherein the LL-PPDU subframe is inserted in place of the at least one A-PPDU subframe in accordance with a periodic time interval indication for inserting LL-PPDU subframes.

27. A method for wireless communications at a station (STA), comprising:
identifying a transmission opportunity associated with communication via at least one subchannel of a wireless channel;
receiving, via the at least one subchannel during the transmission opportunity, a first portion of a packet that includes an aggregated physical layer control protocol (PLCP) protocol data unit (PPDU) (A-PPDU) header and a first subset of A-PPDU subframes of a set of A-PPDU subframes, the set of A-PPDU subframes aggregated in a time domain of the wireless channel;
detecting that a low-latency PPDU (LL-PPDU) subframe associated with latency-sensitive traffic is inserted in place of at least one A-PPDU subframe of a second subset of A-PPDU subframes of the set of A-PPDU subframes;
receiving, via the at least one subchannel during the transmission opportunity, a second portion of the packet that includes the LL-PPDU subframe and the second subset of A-PPDU subframes of the set of A-PPDU subframes in accordance with the A-PPDU header; and
decoding the LL-PPDU subframe in accordance with the detecting and the receiving.

28. The method of claim 27, further comprising:
terminating decoding of a final A-PPDU subframe of the first subset of A-PPDU subframes to decode the LL-PPDU subframe.

29. The method of claim 27, wherein the A-PPDU header comprises a physical layer (PHY) preamble, an indication of a PPDU type, an indication of a periodic time interval for inserting LL-PPDU subframes, and an indication of a length of the packet.

30. The method of claim 29, further comprising:
enabling packet detection at each time interval boundary in accordance with the indication of the periodic time interval, the LL-PPDU subframe detected in accordance with the packet detection.

* * * * *